US012624313B2

(12) United States Patent
Feij et al.

(10) Patent No.: US 12,624,313 B2
(45) Date of Patent: May 12, 2026

(54) SUSPENDING POLYMER COMPOSITION, AND METHOD OF USE THEREOF

(71) Applicant: ISP INVESTMENTS LLC, Wilmington, DE (US)

(72) Inventors: Eric-Jan de Feij, Alphen an den Rijn (NL); Gijsbert Kroon, Giessenburg (NL); Tuttu Maria Nuutinen, Delft (NL); Michael Franzke, Barendrecht (NL)

(73) Assignee: ISP INVESTMENTS LLC, Wilmington, DE (US)

( * ) Notice: Subject to any disclaimer, the term of this patent is extended or adjusted under 35 U.S.C. 154(b) by 457 days.

(21) Appl. No.: 17/925,570

(22) PCT Filed: May 28, 2021

(86) PCT No.: PCT/US2021/034834
§ 371 (c)(1),
(2) Date: Nov. 15, 2022

(87) PCT Pub. No.: WO2021/243198
PCT Pub. Date: Dec. 2, 2021

(65) Prior Publication Data

US 2023/0193160 A1 Jun. 22, 2023

Related U.S. Application Data

(60) Provisional application No. 63/032,189, filed on May 29, 2020.

(51) Int. Cl.
*C11D 3/22* (2006.01)
*C11D 3/39* (2006.01)

(52) U.S. Cl.
CPC .............. *C11D 3/225* (2013.01); *C11D 3/227* (2013.01); *C11D 3/3947* (2013.01); *C11D 2111/10* (2024.01)

(58) Field of Classification Search
CPC ....... C11D 3/225; C11D 3/227; C11D 3/3947; C11D 2111/01
See application file for complete search history.

(56) References Cited

U.S. PATENT DOCUMENTS 4,313,765 A 2/1982 Baird et al.
4,804,385 A 2/1989 Grollier et al.
(Continued)

FOREIGN PATENT DOCUMENTS

CN 1049785 A 3/1991
CN 107440078 A 12/2017
(Continued)

OTHER PUBLICATIONS

International Search Report of PCT/US21/034834 published on Dec. 2, 2021.
(Continued)

*Primary Examiner* — Angela C Brown-Pettigrew
(74) *Attorney, Agent, or Firm* — Aseem Mehta; Nathalie Tietcheu

(57) ABSTRACT

The present disclosure relates to a suspending polymer composition comprising a blend of: (i) about 40 to about 80 wt. % of hydroxypropylmethylcellulose (HPMC); (ii) about 10 to about 30 wt. % of xanthan gum; and (iii) about 10 to about 30 wt. % of cetyl-hydroxy ethyl cellulose (cetyl-HEC) for use in personal care or home care compositions. The suspending polymer composition preferably is free of acrylates, methacrylates and derivatives thereof.

24 Claims, 9 Drawing Sheets

Sample 7 -unstable

Sample 8 – unstable

Sample 9- stable

(56) References Cited

U.S. PATENT DOCUMENTS

| | | | |
|---|---|---|---|
| 5,100,653 A | 3/1992 | Campo | |
| 5,100,658 A | 3/1992 | Bolich, Jr. et al. | |
| 5,104,646 A | 4/1992 | Bolich, Jr. et al. | |
| 5,228,909 A | 7/1993 | Burdick et al. | |
| 5,279,313 A | 1/1994 | Clausen et al. | |
| 5,470,383 A | 11/1995 | Schermann et al. | |
| 5,759,579 A | 6/1998 | Singh et al. | |
| 5,843,408 A | 12/1998 | Hattori et al. | |
| 5,905,062 A | 5/1999 | Elliott et al. | |
| 6,306,933 B1 | 10/2001 | Eiger et al. | |
| 6,365,136 B1 | 4/2002 | Lauscher et al. | |
| 7,067,499 B2 | 6/2006 | Erazo-Majewicz et al. | |
| 7,217,752 B2 | 5/2007 | Schmucker-Castner et al. | |
| 7,268,104 B2 | 9/2007 | Krzysik et al. | |
| 7,589,051 B2 | 9/2009 | Erazo-Majewicz et al. | |
| 7,838,477 B2 | 11/2010 | Wenzel et al. | |
| 8,221,732 B2 | 7/2012 | Gutmann et al. | |
| 8,506,939 B2 | 8/2013 | Zhang et al. | |
| 8,512,480 B2 | 8/2013 | Gomez Ruiz et al. | |
| 9,233,066 B2 | 1/2016 | Correa et al. | |
| 10,100,178 B2 | 10/2018 | Russell et al. | |
| 10,561,599 B2 | 2/2020 | Patterson et al. | |
| 10,668,046 B2 | 6/2020 | Criscione | |
| 11,000,473 B2 | 5/2021 | Rubin et al. | |
| 2004/0158058 A1 | 8/2004 | Cash et al. | |
| 2006/0051430 A1 | 3/2006 | Arata et al. | |
| 2007/0258918 A1 | 11/2007 | Modi | |
| 2008/0071077 A1 | 3/2008 | Dijk et al. | |
| 2011/0177017 A1 | 7/2011 | Coffindaffer et al. | |
| 2011/0177018 A1 | 7/2011 | Lipic et al. | |
| 2011/0269658 A1 | 11/2011 | Dihora et al. | |
| 2014/0341957 A1 | 11/2014 | Yang et al. | |
| 2016/0015622 A1* | 1/2016 | Rafferty | A61Q 5/12 424/70.12 |
| 2016/0310404 A1 | 10/2016 | Schrott et al. | |
| 2020/0030208 A1 | 1/2020 | Meyers et al. | |

FOREIGN PATENT DOCUMENTS

| | | |
|---|---|---|
| CN | 106619182 | 11/2019 |
| CN | 109498499 B | 1/2022 |
| DE | 102016222160 A1 | 5/2018 |
| EP | 0048616 B1 | 2/1985 |
| EP | 0806949 A1 | 11/1997 |
| EP | 1200044 A1 | 5/2002 |
| FR | 2984161 A1 | 6/2013 |
| JP | 2008-238115 A2 | 10/2008 |
| KR | 10-2012-0022012 A | 3/2012 |
| WO | WO2013040174 A1 | 3/2013 |
| WO | WO2016154701 A1 | 10/2016 |
| WO | WO2019025233 A1 | 2/2019 |
| WO | WO2019115944 A1 | 6/2019 |
| WO | WO2020123484 A1 | 6/2020 |
| WO | WO2021104844 A1 | 6/2021 |

OTHER PUBLICATIONS

Database GNPD [Online] MINTEL Anonymous: "Ultra Comfort Waterproof Sun Protection SPF 50+ Pa++++", XP055855301, Database Accession No. 7587255.

* cited by examiner

Sample 7 -unstable Sample 8 – unstable Sample 9- stable

From left to right: Formula with silicone, Antidandruff formula, Silicone-free formula with natural oils, Sulfate free formula.

SUSPENDING POLYMER COMPOSITION, AND METHOD OF USE THEREOF

FIELD OF THE INVENTION

The present application relates to a polymer composition, and more particularly, to a suspending polymer composition comprising a blend of: (i) hydroxypropylmethylcellulose (HPMC); (ii) xanthan gum; and (iii) cetyl-hydroxy ethyl cellulose (cetyl-HEC), wherein the composition finds particular utility in personal care and home care compositions.

BACKGROUND OF THE INVENTION

Various substantially insoluble compounds cannot be adequately stabilized in aqueous surfactant containing compositions. For example, aqueous surfactant formulations that contain silicone additives, such as personal care and home care composition, tend to isolate from their surfactant base. Conventional polymeric rheology modifiers, such as carbomers and/or acrylates and alkyl acrylate cross polymers have been used to improve viscosity.

There are naturally derived thickening technologies already on the market such as xanthan gum, bentonite, hectorite, cellulose gum and guar. The challenge is that most of the technologies provide only thickening but not suspension performance. The ingredients which suspend can have a negative influence on sensorial benefits (rheology, foam) and silicone deposition. Also, stability is often an issue. Currently no ingredients are meeting all the formulators' requirements.

U.S. Pat. No. 7,217,752B2 describes a stable, aqueous composition containing a substantially crosslinked alkali-swellable acrylate copolymer rheology modifier, a surfactant, an alkaline material, and various compounds therein, as for example, substantially insoluble materials requiring suspension or stabilization, such as a silicone, an oily material, or a pearlescent material.

U.S. Pat. No. 7,589,051B2 describes the use of cationic oxidized polysaccharide compositions in personal care and household compositions.

PCT Application 2019025233A describes cosmetic compositions, especially hair cleaning compositions or hair styling compositions comprising a biobased polymer for improving the appearance and manageability of hair.

PCT Application 2016154701A describes a hair cosmetic composition comprising a thiol-based compound selected from thiolactic acid and its derivatives or salts, and a thickening agent selected from thickening polymers comprising at least one sugar unit, for instance nonionic guar gums, optionally modified with C1-C6 hydroxyalkyl groups, biopolysaccharide gums of microbial origin, such as scleroglucan gum or xanthan gum, gums derived from plant exudates, such as gum arabic, ghatti gum, karaya gum, gum tragacanth, carrageenan gum, agar gum and carob gum, pectins, alginates, starches, hydroxy (C1-C6) alkylcelluloses (hydroxyalkyl celluloses), and carboxy (C1-C6) alkylcelluloses, and mixtures thereof, and preferably from hydroxyalkyl cellulose, such as hydroxyethylcellulose, hydroxymethylcellulose, methylhydroxyethylcellulose, hydroxypropylcellulose, hydroxybutylcellulose, hydroxyethylmethylcellulose (also known as methyl hydroxyethylcellulose) and hydroxypropylmethylcellulose, cetyl hydroxyethylcellulose, and mixtures thereof.

In view of the foregoing, still there is a need to develop and produce sufficiently stabilized aqueous surfactant-based compositions that can include water-insoluble materials such as silicones, oily materials, pearlescent materials, cationic hair dyes, and other substantially insoluble materials.

Accordingly, it is an objective of the present application to provide a novel suspending system or composition which is free from or substantially free from carbomer/acrylates for personal care or home care applications, wherein said suspending composition can produce sufficiently stabilized aqueous surfactant-based compositions that comprise at least one water insoluble material. Accordingly, the present application provides a unique blend consisting of naturally derived rheology modifiers to provide a performance comparable or even better than existing carbomer or acrylate-based rheology modifiers in surfactant-based personal care and home care applications and systems.

Accordingly, the multifunctional natural based cellulosic/polysaccharide blend described in this application consisting of hydroxypropylmethylcellulose (HPMC), xanthan gum and cetyl hydroxyethylcellulose (cetyl-HMHEC) provides improved properties compared to the existing natural technologies. The blend is salt tolerant, compatible with cationic ingredients and transparent. Further, the blend does not require neutralization and provides excellent suspension of water insoluble ingredients in personal care and home care applications. Moreover, the blend is compatible with anionic, cationic and nonionic ingredients, and demonstrates good electrolyte tolerance.

SUMMARY OF THE INVENTION

The primary aspect of the present application is to provide a suspending polymer composition free of acrylates and methacrylates comprising a blend of: (i) about 40 to about 80 wt. % of hydroxypropylmethylcellulose (HPMC); (ii) about 10 to about 30 wt. % of xanthan gum; and (iii) about 10 to about 30 wt. % of cetyl-hydroxy ethyl cellulose (cetyl-HEC) particularly for use in aqueous based personal care or home care compositions.

One aspect of the present application provides a suspending polymer composition comprising a blend of; (i) about 50 to about 70 wt. % of hydroxypropylmethylcellulose (HPMC); (ii) about 15 to about 25 wt. % of xanthan gum; and (iii) about 15 to about 25 wt. % of cetyl-hydroxy ethyl cellulose (cetyl-HEC).

In another aspect, the suspending polymer composition can be used in aqueous and non-aqueous based personal care composition or home care compositions.

In another aspect, the present application provides an aqueous, acrylate and methacrylate free, surfactant-based personal care or home care composition comprising: (a) about 0.05 to about 5 wt. % of a suspending polymer composition comprising a blend of (i) about 50 to about 60 wt. % of hydroxypropylmethylcellulose (HPMC); (ii) about 10 to about 20 wt. % of xanthan gum; (iii) about 10 to about 20 wt. % of cetyl-hydroxy ethyl cellulose; (b) about 0.1 to about 30 wt. % of at least one surfactant selected from the group consisting of anionic, cationic, nonionic, zwitterionic, amphoteric and combinations thereof; (c) 0.1 to 10 wt. % of at least one home care ingredient or personal care ingredient; and (d) about 30 to 70 wt. % water based on the total weight of the composition.

In another aspect, the present application provides an aqueous, acrylate and methacrylate free, surfactant-based shampoo composition comprising: (a) about 0.05 to about 5 wt. % of a suspending polymer composition comprising a blend of (i) about 50 to about 60 wt. % of hydroxypropylmethylcellulose (HPMC); (ii) about 10 to about 20 wt. % of xanthan gum; (iii) about 10 to about 20 wt. % of cetyl-hydroxy ethyl cellulose; (b) about 0.1 to about 30 wt. % of at least one surfactant selected from the group consisting of anionic, cationic, nonionic, zwitterionic, amphoteric and combinations thereof; (c) 0.1 to 10 wt. % of at least one home care ingredient or personal care ingredient; and (d) about 30 to 70 wt. % water based on the total weight of the composition.

BRIEF DESCRIPTION OF THE FIGURES

Further embodiments of the present application can be understood with the appended figures.

DETAILED DESCRIPTION OF THE INVENTION

Figure 1:
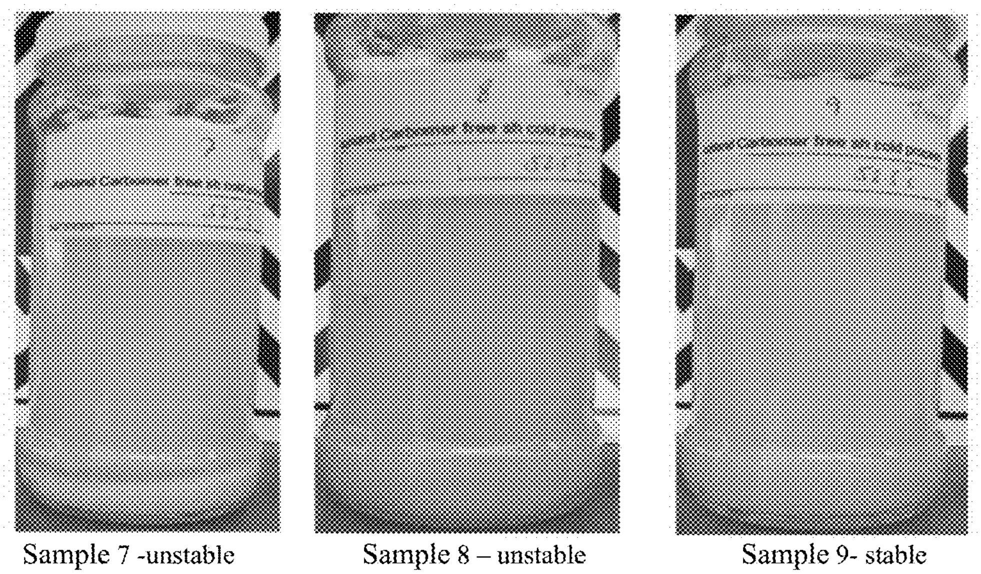
FIG. 1 represents fully formulated shampoos presented in the Table 1 after 1 month test at 52° C.

Before explaining at least one aspect of the disclosed and/or claimed inventive concept(s) in detail, it is to be understood that the disclosed and/or claimed inventive concept(s) is not limited in its application to the details of construction and the arrangement of the components or steps or methodologies set forth in the following description or illustrated in the drawings. The disclosed and/or claimed inventive concept(s) is capable of other aspects or of being practiced or carried out in various ways. Also, it is to be understood that the phraseology and terminology employed herein is for the purpose of description and should not be regarded as limiting.

As utilized in accordance with the disclosure, the following terms, unless otherwise indicated, shall be understood to have the following meanings.

Unless otherwise defined herein, technical terms used in connection with the disclosed and/or claimed inventive concept(s) shall have the meanings that are commonly understood by those of ordinary skill in the art. Further, unless otherwise required by context, singular terms shall include pluralities and plural terms shall include the singular.

The singular forms “a,” “an,” and “the” include plural forms unless the context clearly dictates otherwise specified or clearly implied to the contrary by the context in which the reference is made. The term “Comprising” and “Comprises of” includes the more restrictive claims such as “Consisting essentially of” and “Consisting of”.

For purposes of the following detailed description, other than in any operating examples, or where otherwise indicated, numbers that express, for example, quantities of ingredients used in the specification and claims are to be understood as being modified in all instances by the term “about”. The numerical parameters set forth in the specification and attached claims are approximations that may vary depending upon the desired properties to be obtained in carrying out the invention.

All percentages, parts, proportions and ratios as used herein, are by weight of the total composition, unless otherwise specified. All such weights as they pertain to listed ingredients are based on the active level and, therefore; do not include solvents or by-products that may be included in commercially available materials, unless otherwise specified.

All publications, articles, papers, patents, patent publications, and other references cited herein are hereby incorporated herein in their entirety for all purposes to the extent consistent with the disclosure herein.

The use of the term “at least one” will be understood to include one as well as any quantity more than one, including but not limited to, 1, 2, 3, 4, 5, 10, 15, 20, 30, 40, 50, 100, etc. The term “at least one” may extend up to 100 or 1000 or more depending on the term to which it is attached. In addition, the quantities of 100/1000 are not to be considered limiting as lower or higher limits may also produce satisfactory results.

As used herein, the words “comprising” (and any form of comprising, such as “comprise” and “comprises”), “having” (and any form of having, such as “have” and “has”), “including” (and any form of including, such as “includes” and “include”) or “containing” (and any form of containing, such as “contains” and “contain”) are inclusive or open-ended and do not exclude additional, unrecited elements or method steps.

The term “each independently selected from the group consisting of” means when a group appears more than once in a structure, that group may be selected independently each time it appears.

The term “polymer” refers to a compound comprising repeating structural units (monomers) connected by covalent chemical bonds. Polymers may be further derivatized, cross-linked, grafted or end-capped. Non-limiting examples of polymers include copolymers, terpolymers, tetrapolymers, quaternary polymers, and homologues. The term “copolymer" refers to a polymer consisting essentially of two or more different types of monomers polymerized to obtain said copolymer.

In a non-limiting embodiment, the present application discloses a suspending polymer composition comprising a blend of: (i) about 40 to about 80 wt. % of hydroxypropylmethylcellulose (HPMC); (ii) about 10 to about 30 wt. % of xanthan gum; and (iii) about 10 to about 30 wt. % of cetyl-hydroxy ethyl cellulose (cetyl-HEC).

As used herein, "hydroxypropylmethylcellulose (HPMC)" refers to the following non-limiting commercially available HPMC products under the tradenames including Methocel® from Dow, PharmaCoat® from Shin-Etsu, and Benecel® or Culminal® MHPC from Ashland LLC.

In one embodiment of the present application, it is contemplated to employ at least one additional methylcellulose ether compound selected from the group consisting of methylcellulose (MC), hydroxyethylmethylcellulose (HEMC), and methylhydroxyethylcellulose (MHEC) in the suspending polymer blend composition of the present application.

As used herein, "xanthan gum" refers to a polysaccharide gum produced by the *Xanthomonas campestris* bacterium. Xanthan gum is useful industrially and is capable of producing a large increase in the viscosity of a liquid. Any commercially available xanthan gum may be used in the present invention. The suitable commercial xanthan gums include, but are not limited to, Kelzan® (Kelco), Rhodopol®23 (Rhone Poulenc) or Veegum® (R. T. Vanderbilt). The preferred high molecular weight polysaccharides useful in the practice of the present invention include xanthan gum having a molecular weight of about 10,000 to about 600,000 Daltons.

The cetyl-hydroxyethylcellulose (cetyl-HEC) useful herein preferably has a weight average molecular weight of about 50,000 to about 1,000,000 Daltons, more preferably about 200,000 to about 700,000 Daltons.

In some embodiments, the suitable range of hydroxypropylmethylcellulose (HPMC) for the present application can be varied from about 40 wt. % to about 45 wt. %, or from about 45 wt. % to about 50 wt. %, or from about 50 wt. % to about 55 wt. %, or from about 55 wt. % to about 60 wt. %, or from about 60 wt. % to about 65 wt. %, or from about 65 wt. % to about 70 wt. %, or from about 70 wt. % to about 75 wt. %, or from about 75 wt. % to about 80 wt. % based on the total weight of the suspending polymer composition.

In some embodiments, the suitable range of xanthan gum for the present application can be varied from about 10 wt. % to about 15 wt. %, or from about 15 wt. % to about 20 wt. %, or from about 20 wt. % to about 25 wt. %, or from about 25 wt. % to about 30 wt. % based on the total weight of the suspending polymer composition.

In some embodiments, the suitable range of cetyl-hydroxyethylcellulose (cetyl-HEC) for the present application can be varied from about 10 wt. % to about 15 wt. %, or from about 15 wt. % to about 20 wt. %, or from about 20 wt. % to about 25 wt. %, or from about 25 wt. % to about 30 wt. % based on the total weight of the suspending polymer composition.

In a non-limiting embodiment, the present application discloses that the suspending polymer composition can be used in personal care or home care products and compositions, and wherein, the compositions can be an aqueous or non-aqueous based composition. In one embodiment, the composition can be an aqueous composition.

A non-limiting embodiment of the present application discloses an aqueous personal care or home care composition comprising: (a) about 0.05 to about 5 wt. % of a suspending polymer composition blend of comprising: (i) about 40 to about 80 wt. % of hydroxypropylmethylcellulose (HPMC); (ii) about 10 to about 30 wt. % of xanthan gum; (iii) about 10 to about 30 wt. % of cetyl-hydroxyethyl cellulose (cetyl-HEC); (b) about 0.1 to about 30 wt. % of at least one surfactant selected from the group consisting of anionic, cationic, nonionic, zwitterionic, amphoteric and combinations thereof; (c) about 0.1 to about 10 wt. % of at least one home care ingredient or personal care ingredient; and (d) about 30 to about 70 wt. % water based on the total weight of the composition.

The suitable surfactant for the purpose of the present application can be selected from the group consisting of anionic, zwitterionic, amphoteric, nonionic, or cationic surfactants, or combinations thereof.

Nonionic surfactants can be broadly defined as compounds containing a hydrophobic moiety and a nonionic hydrophilic moiety. Examples of the hydrophobic moiety can be alkyl, alkyl aromatic, dialkyl siloxane, polyoxyalkylene, and fluoro-substituted alkyls. Examples of hydrophilic moieties are polyoxyalkylenes, phosphine oxides, sulfoxides, amine oxides, and amides. Nonionic surfactants such as those marketed under the trade name Surfynol® are also useful in this invention. Nonionic surfactants useful herein include compounds produced by the condensation of alkylene oxide groups (hydrophilic in nature) with an organic hydrophobic compound which maybe aliphatic or alkylaromatic in nature. Non-limiting examples of suitable nonionic surfactants include: poloxamers (sold under the trade name Pluronic® by BASF Corporation), polyethylene oxide condensates of alkyl phenols, products derived from the condensation of ethylene oxide with the reaction product of propylene oxide and ethylene diamine, ethylene oxide condensates of aliphatic alcohols, long chain tertiary amine oxides, long chain tertiary phosphine oxides, long chain dialkyl sulfoxides, and blends thereof.

Cationic surfactants useful in vehicle systems of the compositions of the present invention can contain amino or quaternary ammonium hydrophilic moieties which are positively charged when dissolved in the aqueous composition of the present invention. Non-limiting examples of suitable cationic surfactants include: derivatives of aliphatic quaternary ammonium compounds having at least one long alkyl chain containing from about 8 to about 18 carbon atoms, such as, lauryl trimethylammonium chloride, cetyl pyridinium chloride, cetyl trimethylammonium bromide, diisobutylphenoxyethyl-dimethylbenzylammonium chloride, coconut alkyltrimethylammomum nitrite, cetyl pyridinium fluoride, and blends thereof. Further suitable are quaternary ammonium fluorides having detergent properties such as compounds described in U.S. Pat. No. 3,535,421. Certain cationic surfactants may act as germicides in the compositions disclosed herein.

Cationic surfactants can have a hydrophobe that carries a positive charge or that is uncharged at pH values close to neutrality or lower, such as alkylamines, alkyl imidazolines, ethoxylated amines, and quaternary ammonium compounds. Alkylamines can be salts of primary, secondary and tertiary fatty $C_{12}$-$C_{22}$ alkylamines, substituted or unsubstituted, and substances sometimes referred to as "amidoamines". Non-limiting examples of alkylamines and salts thereof include dimethyl cocamine, dimethyl palmitamine, dioctylamine, dimethyl stearamine, dimethyl soyamine, soyamine, myristyl amine, tridecyl amine, ethyl stearylamine, N-tallowpropane diamine, ethoxylated stearylamine, dihydroxy ethyl stearylamine, arachidylbehenylamine, dimethyl lauramine, stearylamine hydrochloride, soyamine chloride, stearylamine formate, N-tallowpropane diamine dichloride, and amodimethicone (INCI name for a silicone polymer and blocked with amino functional groups, such as aminoethylamino propylsiloxane). Non-limiting examples of amidoamines and salts thereof include stearamido propyl dimethyl amine, stearamidopropyl dimethylamine citrate, palmitamidopropyl diethylamine, and cocamidopropyl dimethylamine lactate. Other cationic surfactants include distearyldimonium chloride, dicetyldimonium chloride, guar hydroxypropyltrimonium chloride, and the like. At low pH, amine oxides may protonate and behave similarly to N-alkyl amines.

Non-limiting examples of alkyl imidazolines include alkyl hydroxyethyl imidazoline, such as stearyl hydroxyethyl imidazoline, coco hydroxyethyl imidazoline, ethyl hydroxymethyl oleyl oxazoline, and the like. Non-limiting examples of ethyoxylated amines include PEG-cocopolyamine, PEG-15 tallow amine, quaternium-52, and the like.

Quaternary ammonium compounds can be selected from monomeric or polymeric materials containing at least one nitrogen atom that is linked covalently to four alkyl and/or aryl substituents, and the nitrogen atom remains positively charged regardless of the environmental pH. Quaternary ammonium compounds comprise a large number of substances that are used extensively as surfactants, conditioners, antistatic agents, and antimicrobial agents and include, alkylbenzyldimethyl ammonium salts, alkyl betaines, heterocyclic ammonium salts, and tetraalkylammonium salts. Long-chain (fatty) alkylbenzyldimethyl ammonium salts are preferred as conditioners, as antistatic agents, and as fabric softeners. Other quaternary ammonium compounds include quaternary ammonium silicones. While various quaternary ammonium compounds are listed for a specific purpose, one of ordinary skill will recognize that the quaternary ammonium compounds described here and throughout the specification can serve more than one function.

Non-limiting examples of alkylbenzyldimethylammonium salts include stearalkonium chloride, benzalkonium chloride, quaternium-63, olealkonium chloride, didecyldimonium chloride, and the like. Alkyl betaine compounds include alkylamidopropyl betaine, alkylamidopropyl hydroxysultaine, and sodium alkylamido propyl hydroxyphostaine. Non-limiting examples of alkyl betaine compounds include oleyl betaine, coco-betaine, cocoamidopropyl betaine, coco-hydroxy sultaine, coco/oleamidopropyl betaine, coco-sultaine, cocoamidopropylhydroxy sultaine, and sodium lauramidopropyl hydroxyphostaine. Heterocyclic ammonium salts include alkylethyl morpholinium ethosulfate, isostearyl ethylimidonium ethosulfate, and alkylpyridinium chlorides, and are generally used as emulsifying agents. Non-limiting examples of heterocyclic ammonium salts include cetylpyridinium chloride, isostearylethylimidonium ethosulfate, and the like. Non-limiting examples of tetraalkylammonium salts include cocamidopropyl ethyldimonium ethosulfate, hydroxyethyl cetyldimonium chloride, quaternium-18, and cocodimonium hyroxypropyl hydrolyzed protein, such as hair keratin, and the like.

Zwitterionic surfactants are exemplified by those which can be broadly described as derivatives of aliphatic quaternary ammonium, phosphonium, and sulfonium compounds, in which the aliphatic radicals can be straight or branched chain, and wherein one of the aliphatic substituents contains from about 8 to about 18 carbon atoms and one contains an anionic water-solubilizing group, e.g., carboxy, sulfonate, sulfate, phosphate, or phosphonate. Non-limiting examples of suitable zwitterionic surfactants include betaines and derivatives of aliphatic quaternary ammonium compounds in which the aliphatic radicals can be straight chain or branched, and which contain an anionic water-solubilizing group, e.g., carboxy, sulfonate, sulfate, phosphate, or phosphonate.

Examples of amphoteric surfactants which can be used in the vehicle systems of the compositions of the present invention are those which are broadly described as derivatives of aliphatic secondary and tertiary amines in which the aliphatic radical can be straight or branched chain and wherein one of the aliphatic substituents contains from about 8 to about 18 carbon atoms and one contains an anionic water solubilizing group, e.g., carboxy, sulfonate, sulfate, phosphate, or phosphonate.

Anionic surfactants useful herein include the water-soluble salts of alkyl sulfates having from 8 to 20 carbon atoms in the alkyl radical (e.g., sodium alkyl sulfate) and the water-soluble salts of sulfonated monoglycerides of fatty acids having from 8 to 20 carbon atoms. Sodium lauryl sulfate (SLS) and sodium coconut monoglycerlde sulfonates are non-limiting examples of anionic surfactants of this type. Non-limiting examples of suitable anionic surfactants include: sarcosinates, taurates, isethionates, sodium lauryl sulfoacetate, sodium laureth carboxylate, and sodium dodecyl benzenesulfonate. Also suitable are alkali metal or ammonium salts of surfactants such as the sodium and potassium salts of the following: lauroyl sarcosinate, myristoyl sarcosinate, palmitoyl sarcosinate, stearoyl sarcosinate, and oleoyl sarcosinate. Other surfactants such as fluorinated surfactants may also be incorporated within the compositions of the invention.

Anionic surfactants include substances having a negatively charged hydrophobe or that carry a negative charge when the pH is elevated to neutrality or above, such as acylamino acids, and salts thereof, for example, acylglutamates, acyl peptides, sarcosinates, and taurates; carboxylic acids, and salts thereof, for example, alkanolic acids and alkanoates, ester carboxylic acids, and ether carboxylic acids; phosphoric acid ester and salts thereof; sulfonic acids and salts thereof, for example, acyl isethionates, alkylaryl sulfonates, alkyl sulfonates, and sulfosuccinates; and sulfuric acid esters, such as alkyl ether sulfates and alkyl sulfates.

Anionic surfactants useful herein include the water-soluble salts of alkyl sulfates having from 8 to 20 carbon atoms in the alkyl radical (e.g., sodium alkyl sulfate) and the water-soluble salts of sulfonated monoglycerides of fatty acids having from 8 to 20 carbon atoms. Sodium lauryl sulfate (SLS) and sodium coconut monoglycerlde sulfonates are non-limiting examples of anionic surfactants of this type. Non-limiting examples of suitable anionic surfactants include: sarcosinates, taurates, isethionates, sodium lauryl sulfoacetate, sodium laureth carboxylate, and sodium dodecyl benzenesulfonate. Also suitable are alkali metal or ammonium salts of surfactants such as the sodium and potassium salts of the following: lauroyl sarcosinate, myristoyl sarcosinate, palmitoyl sarcosinate, stearoyl sarcosinate, and oleoyl sarcosinate. Other surfactants such as fluorinated surfactants may also be incorporated within the compositions of the invention.

Non-limiting examples of anionic surfactants include mono-basic salts of acylglutamates that are slightly acidic in aqueous solution, such as sodium acylglutamate and sodium hydrogenated tallow glutamate; salts of acyl-hydrolyzed protein, such as potassium, palmitoyl hydrolyzed milk protein, sodium cocoyl hydrolyzed soy protein, and TEA-abietoyl hydrolyzed collagen; salts of acyl sarcosinates, such as ammonium myristoyl sarcosine, sodium cocoyl sarcosinate, and TEA-lauroyl sarcosinate; salts of sodium methyl acyltaurates, such as sodium lauroyl taurate and sodium methyl cocoyl taurate; alkanoic acids and alkanoates, such as fatty acids derived from animal and vegetable glycerides that form water-soluble soaps and water-insoluble emulsifying soaps, including sodium stearate, aluminum stearate, and zinc undecylenate; ester carboxylic acids, such as dinonoxynol-9-citrate; salts of acyl lactylates such as calcium stearoyl lactylate and laureth-6 citrate; ethercarboxylic acids derived from ethyoxylated alcohols or phenols having varying lengths of polyoxyethylene chains, such as nonoxynol-8 carboxylic acid, and sodium trideceth-13 carboxylate; mono- and di-esters of phosphoric acid and their salts, such as phospholipids, dilaureth-4-phosphate, DEA-oleth-10 phosphate and triethanolamine lauryl phosphate; salts of acylisethionate, such as sodium cocoyl isethionate; alkylarylbenzene sulfonates, such as alpha-olefin sulfonate (AOS) and alkali metal, alkaline earth metal, and alkanolamine salts thereof, and sodium dodecylbenzene sulfonate; alkyl sulfonates, such as sodium $C_{12}$-$C_{14}$ olefin sulfonate, sodium cocomonoglyceride sulfonate, sodium $C_{12}$-$C_{15}$ pareth-15 sulfonate, and sodium lauryl sulfoacetate; sulfosuccinates, such as mono- and di-esters of sulfosuccinic acid, salts thereof and alkoxylated alkyl and alkylamido derivatives thereof, such as di-$C_4$-$C_{10}$ alkyl sodium sulfosuccinate, disodium laureth sulfosuccinate, disodium oleamido MEA-sulfosuccinate, and disodium $C_{12}$-$C_{15}$ pareth sulfosuccinate; alkyl ether sulfates, such as sodium and ammonium lauryl ether sulfate (having about 1 to about 12 moles ethylene oxide); alkyl sulfates, such as sodium, ammonium and triethanolamine salts of $C_{12}$-Cis alkylsulfates, sodium $C_{12}$-$C_{14}$ olefin sulfates, sodium laureth-6 carboxylate, sodium $C_{12}$-$C_{18}$ pareth sulfate, and the like.

Also suitable as surfactants are the following commercial products: (1) Alkanolamides, under the trade names Amidex and Schercomid; amido-amines, under the trade names Katemul and Schercodine; amine oxides, under the trade names Chemoxide™ and Schercamox™; amphoterics, under the trade names Chembetaine™, Schercotaine™ and Schercoteric™; imidazolines, under the trade name Schercozoline™; pearlizing agents, under the trade name Quickpearl™; performance concentrates, under the trade names Sulfochem™ and Chemoryl™; soaps (potassium cocoate and potassium soyate); specialty ethoxylates, under the trade name Chemonic™; specialty quats under the trade names Quatrex and Schercoquat, sulfates, under the trade name Sulfochem; and sulfosuccinates, under the trade name Chemccinate™ from Lubrizol. (2) Avaniel, Cremaphore®, Jordapan®, and Pluracare® from BASF Corp. (3) Miracare® SLB, Mackam® Bab, Mackanate® Ultra SI, Miranof Ultra, and Miracare® Plaisant from Rhodia. (4) Stepan® Pearl 2, Stepan® Pearl 4, Stepan® Pearl Series, Neobee® M-20, Stepan® PTC, Amphosol® 2CSF, Steol®, Stepan-Mild® GCC, Stepan® SLIAFB, Stepanol® AM, Stepanol® PB, Alpha-Step® BSS-45, Bio-Terge® 804, Stepan-Mild® L3, Stepan® SLL-FB, Stepan® SSL-CG, and Stepanol® CFAS-70 from Stepan Company.

Also suitable as surfactants are those described in the book Surfactants in Personal Care Products and Decorative Cosmetics, Third Edition, 2006, CRC Press, the disclosure of which is incorporated hereby in its entirety by reference.

In some embodiments, the present application discloses a suitable range of surfactant can be varied from about 0.1 wt. % to about 1 wt. %, or from about 1 wt. % to about 2.5 wt. %, or from about 2.5 wt. % to about 5 wt. % or from about 5 wt. % to about 10 wt. %, or 10 wt. % to about 15 wt. %, or from about 15 wt. % to about 20 wt. %, or from about 20 wt. % to about 25 wt. %, or from about 25 wt. % to about 30 wt. % based on the total weight of the aqueous personal or home care composition.

According to another embodiment of the present application, it is contemplated to employ at least one personal care ingredient selected from the group consisting of water-insoluble ingredients, oxidizing agents, conditioning agents, humectants, pH adjusting buffers, waxes, mineral oils, emulsifiers, fatty substances, gelling agents, thickeners, emollients, hydrophilic or lipophilic active agent, antioxidants, sequestering agents, preserving agents, acidifying or basifying agents, fragrances, fillers, dyestuffs, plant extracts, moisturizers, proteins, peptides, neutralizing agents, solvents, anti-dandruff ingredients, reducing agents and combinations thereof.

According to another embodiment of the present application, it is contemplated to employ at least one home care ingredient selected from the group consisting of water-insoluble ingredients, solvents, phosphates, phosphonates, chelating agents, defoamers, fabric conditioners, polish additives, plasticizers, colorants, preservatives, fragrances, antifoam compounds, antibacterial or antifungal agents, abrasives, enzymes, optical brighteners, antioxidants, emulsifiers, functional polymers, viscosifying agents, oils, dyes transfer inhibitors, alcohols, hydrotropes, dye sequestrants, colour fixatives, anti-redeposition agents, pH controlling agents, electrolytes, bleaching agents, softeners, fibres and care agents and combinations thereof.

In some embodiments, the suitable range of home care ingredient or personal care ingredient for the present application can be varied from about 0.1 wt. % to about 1 wt. %, or from about 1 wt. % to about 5 wt. %, or from about 5 wt. % to about 10 wt. % based on the total weight of the aqueous personal or home care composition.

In a non-limiting embodiment, the present application discloses that the home care ingredient or personal care ingredient comprises at least one water-insoluble ingredient selected from the group consisting of silicones, natural and synthetic oils, emollients, inorganic and organic pearlescent pigments, beads, fatty alcohols, discrete particles and polymers. In some embodiments, the suitable range of water-insoluble ingredient present in the home care or personal care composition can be varied from about 0.1 wt. % to about 1 wt. %, or from about 1 wt. % to about 2.5 wt. %, or from about 2.5 wt. % to about 5 wt. % or from about 5 wt. % to about 10 wt. %, based on the total weight of the aqueous personal or home care composition.

According to the present application, non-limiting examples of silicone(s) can be selected from the group of polydimethylsiloxane, amodimethicone, amodimethicone macroemulsion or microemulsion, dimethicone, dimethiconol (silicone gum), cyclomethicone, phenyltrimethicone, a dimethicone or dimethiconol microemulsion or macroemulsion, an organo polysiloxane, alkoxysilicone, or any combination thereof.

The silicone used herein can be selected from silicone fluids, silicone oils, cationic silicones, silicone gums, high refractive silicones, silicone resins, emulsified silicones, dimethicone copolyols, amodimethicones and combinations thereof.

Dimethicone copolyols useful herein are disclosed in U.S. Pat. Nos. 5,136,063 and 5,180,843, the disclosures of which are incorporated herein by reference. In addition, dimethicone copolyols are commercially available under the Silsoft® and Silwet® brand names from the General Electric Company (GE-OSi). Specific product designations include but are not limited to Silsoft 305, 430, 475, 810, 895, Silwet L 7604 (GE-OSi); Dow Corning® 5103 and 5329 from Dow Corning Corporation; and Abil® dimethicone copolyols, such as, for example WE 09, WS 08, EM 90 and EM 97 from Evonik Goldschmidt Corporation; and Silsense™ dimethicone copolyols, such as Silsense Copolyol-1 and Silsense Copolyol-7, available from Lubrizol Advanced Materials, Inc.

In another non-limiting embodiment, the water-insoluble pearlescent pigments are selected from the group of titanium dioxide, zirconium oxide or cerium oxide, zinc oxide, iron oxide or chromium oxide, manganese violet, ultramarine blue and ferric blue, carbon black, and lakes based on cochineal carmine or on barium, strontium, calcium or aluminum, white nacreous pigments such as mica coated with titanium or with bismuth oxychloride, colored nacreous pigments such as titanium mica with iron oxides, titanium mica especially with ferric blue or with chromium oxide and mixtures thereof.

In a non-limiting embodiment, the present application discloses a shampoo composition including particles of titanium dioxide coated mica. These particles may vary in size from 2 to 150 μm in diameter. In general, smaller particles give rise to a shampoo composition having a pearly appearance, whereas particles having a larger average diameter will result in a glittery shampoo composition.

In a non-limiting embodiment, the present application discloses that the use levels of suspending polymer composition can be varied from about 0.05 wt. % to about 0.1 wt. %, from about 0.1 wt. % to about 1 wt. %, or from about 1 wt. % to about 2.5 wt. %, or from about 2.5 wt. % to about 5 wt. % according to type of home care compositions or personal care compositions.

As per another embodiment of the present application, the aqueous personal care composition or aqueous home care composition of the present application is formulated into a spray, a lotion, a mousse, a fluid, a serum, a solution, a perm, an emulsion, a gel, a vesicle a dispersion, a paste, a cream, a solid stick, a shampoo, a balm, a wipe, a milk, a foam, a jelly, and/or a liquid.

According to another non-limiting embodiment of the present application, the personal care composition is a rinse-off type composition, wherein such rinse-off type of product comprising the above-described suspending polymer composition can provide desired suspension of water insoluble ingredients of hair care compositions or skin care compositions.

In another embodiment, it is contemplated that the suspending polymer composition blend can be used to thicken the water based systems or compositions irrespective of the application that they belong to, particularly, personal care compositions, home care compositions, industrial compositions, coating compositions, ink compositions, metal fluid compositions, cement compositions, oil well drilling fluid compositions, oral care compositions, food compositions and beverage compositions.

In another embodiment of the present application, it is contemplated that the personal care compositions comprising the above-described suspending polymer composition can be selected from the group consisting of hair-care products, shampoos, hair conditioners, leave in and rinse off conditioners, styling and treating hair compositions, hair perming products, hair relaxants, hair straighteners, hair sprays and lacquers, permanent hair dyeing systems, hair styling mousses, hair gels, semi-permanent hair dyeing systems, temporary hair dyeing systems, hair bleaching systems, permanent hair wave systems, hair setting formulations, skin-care products, bath products, shower products, liquid soaps, bar soaps, fragrances and/or odoriferous ingredients consisting preparations, dentifrices, deodorizing and antiperspirant preparations, decorative preparations, light protection formulations, shaving lotions, body oils, body lotions, body gels, treatment creams, body cleaning products, skin protection ointments, shaving and aftershave preparations, skin powders, lipsticks, nail varnishes, eye shadows, mascaras, dry and moist make-up, rouge, powders, depilatory agents and/or sun care products.

According to another embodiment of the present application, it is contemplated that the home care compositions comprising the above-described suspending polymer composition can be selected from the group consisting of laundry detergents, dish washing products, heavy duty cleaning products, machinery lubricating products, disinfecting products, and fabric enhancing products, fabric softeners, fabric abrasion reducing products, toilet cleaning products, floor cleaning products, window cleaning products, auto polishing products, auto cleaning products, shoe polishes, shoe restoration products, paint remover products, household fragrance products, wall coloring products and wall paper adhesives products.

According to still another embodiment, the suspending polymer blend composition used for aqueous personal care or aqueous home care composition is completely free or substantially free of acrylates or methacrylates and derivatives thereof.

Further, certain aspects of the present application are illustrated in detail by way of the following examples. The examples are given herein for illustration of the application and are not intended to be limiting thereof.

EXAMPLES

Hydroxypropylmethylcellulose (HPMC) or methylhydroxypropylcellulose (MHPC) rheology modifier commercially available from Ashland LLC—Table 1) were evaluated.

Example 1: Hypromellose (HPMC) Grades

| Substitution Type | Weight Average Molecular Weight | Nominal Viscosity (mPa · s)a |
|---|---|---|
| Hypromellose | 400,000 | 2,700-5,040 |
| | 746,000 | 7,500-14,000 |
| | 164,000 | 80-120 |
| | 200,000 | 200-300 |
| | 250,000 | 562-1050 |
| | 300,000 | 1,125-2,10 0 |
| | 400,000 | 2,700-5,040 |
| | 575,000 | 13,500-25,200 |
| | 675,000 | 26,250-49,000 |
| | 1,000,000 | 75,000-140,00 |
| | 1,200,000 | 150,000-280,000 |
| | 400,000 | 2,700-5,040 |
| | 575,000 | 13,500-25,200 |
| | 1,000,000 | 75,000-140,000 |

Example 2

A blend consisting of 65% hydroxypropylmethylcellulose, 17.5 Xanthan gum and 17.5% cetyl-hydroxyethylcellulose was used to suspend water insoluble ingredients in surfactant-based rinse-off systems (Table 2). Water insoluble ingredients in this example are silicones (dimethiconol) and Mica. Fully formulated shampoo which was used for the studies (Table 3).

TABLE 2

Composition of the blend used in the conditioners

| Ingredients | % w/w |
|---|---|
| Hydroxypropyl Methylcellulose | 65.0 |
| Cetyl hydroxyethylcellulose | 17.5 |
| Xanthan Gum | 17.5 |
| Total | 100 |

TABLE 3

Formulated Shampoo

| Ingredients | % w/w |
|---|---|
| Phase A | |
| Aqua (Deionized Water) | Add 100% |
| Mica and Titanium oxide | 0.10 |
| Guar Hydroxypropyltrimonium Chloride | 0.20 |
| Citric acid | 0.05 |
| Cocamidopropyl Betaine | 6.67 |
| Sodium Laureth Sulfate | 42.86 |
| Sodium hydroxide | a.n |
| Phase B | |
| Glycerin | 3.00 |
| Xanthan gum | 0.15 |
| Hydroxypropyl Methylcellulose | 0.55 |
| Cetyl Hydroxyethylcellulose | 0.15 |
| Phase C | |
| Dimethiconol (and) TEA-Dodecylbenzenesulfonate | 3.00 |
| Phenoxyethanol and Caprylyl Glycol | 1.00 |
| Parfum | 0.50 |
| Phase D | |
| Citric Acid | a.n. |
| Sodium Chloride | a.n.(1%) |
| Total | 100.00 |

*a.n: denotes as needed

The shampoo passed 1 month accelerated stability test at 52.5° C. It was also tested to be stable 3 M at 45° C. (industry benchmark test method). Xanthan gum at dose level 0.4% did not pass the test. Phase A: N-Hance 3196 was dispersed in water & mix until lump free. Citric Acid was added and mixed until fully hydrated. Surfactants were added in the right order of Table 3 formulated shampoo, ingredients were dispersed of phase B in Glycerin and add to phase A. Add the ingredients of Phase C in order with good stirring and adjust Phase D the pH with Sodium Hydroxide (33%) or Citric acid (50%) and Sodium Chloride to the desired viscosity. The pH was maintained at 5.5-6.0 and Viscosity at 5,000-9,000 mPa·s Brookfield LVT Spindle #3, 12 RPM, 1 min @ 25° C.

It was observed from FIG. 1 that to achieve the required suspension stability all 3 ingredients are required (the product on the right). The sample on the left was consisting of a combination of xanthan gum and HPMC and the example in the middle contains a blend of HPMC and HMHEC. These samples are not stable over time.

Example 3: Emulsion Stabilization

Hair care conditioners are typically lamellar gel phases having a fixed ratio of cationic surfactants and fatty alcohol.

The most widely ratio is 1:3. The most widely used cationic surfactants are Behentrimonium Chloride, Cetrimonium Chrloride and Tertiary amine salts. The typical fatty alcohols could be Cetearyl Alcohol, Cetyl Alcohol and Stearyl Alcohol. The total amount of the lamellar gel ingredients was related to the rheological properties such as viscosity and stability and sensorial properties. Consumer's perception related to the conditioning performance relates to the texture of the product. The rich texture relates to an assumption of high level of conditioning. For that reason, a typical dose level of cationic surfactants in a lamellar gel conditioner was 2 wt % and fatty alcohol 6 wt %. The high ingredient level though is not influencing on the hair conditioning properties. It is possible to split the amount of lamellar gel and have the same level of conditioning performance. The challenge of the reduced gel phase was related to a thin consistency and instability of the conditioner.

Figure 2:
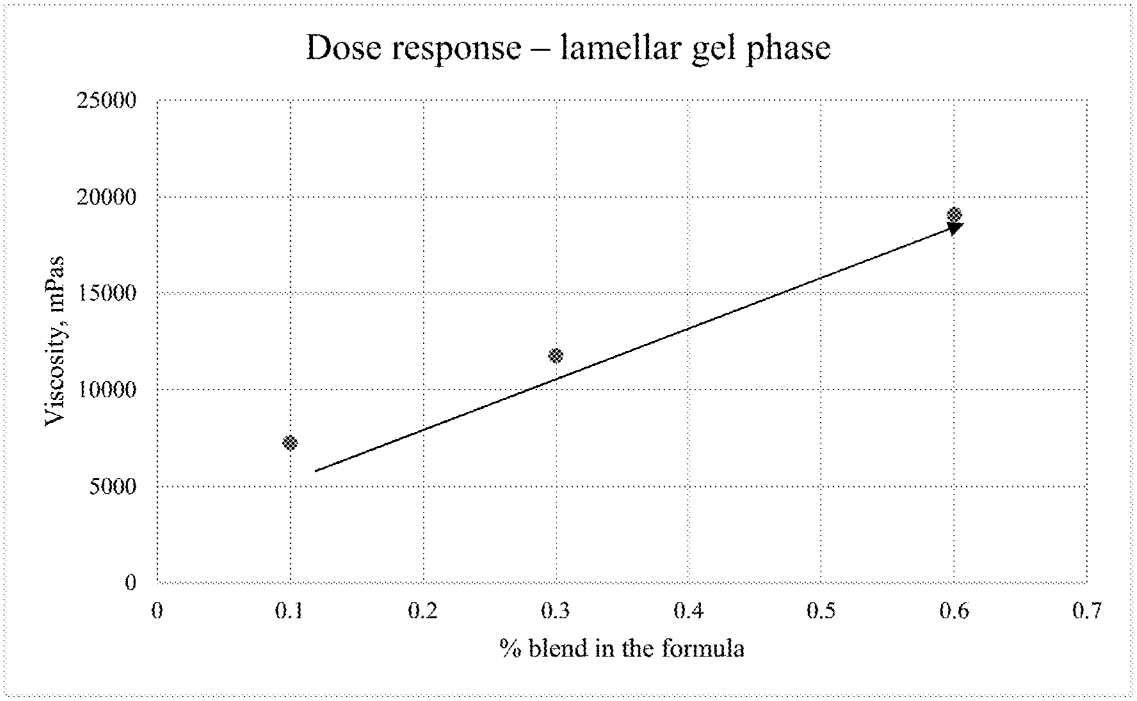
FIG. 2 shows dose response performance in a lamellar gel system.

These challenges can be overcome by using an additional polymeric rheology modifier. The lamellar gel phases have a cationic nature and for that reason the anionic rheology modifiers such as acrylates and xanthan gum cannot be used for this application to stabilize the systems. It has been shown that a blend of naturally derived polysaccharides described in this application was compatible with cationic systems and stabilizes systems with a reduced lamellar gel phase. A typical dose level could be 0.1-0.6 w-%. In the graph below a dose response behavior is presented (FIG. 2).

Example 4: Silicone Deposition

Figure 3:
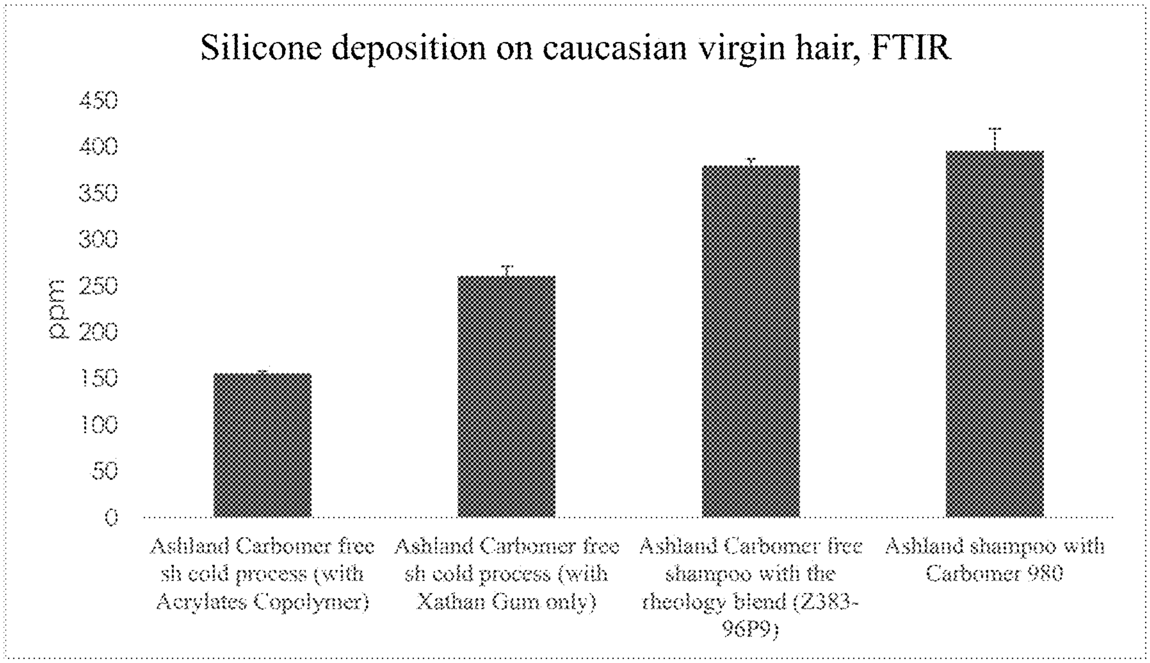
FIG. 3 represents silicone deposition on damaged hair out of a shampoo.
Figure 4:
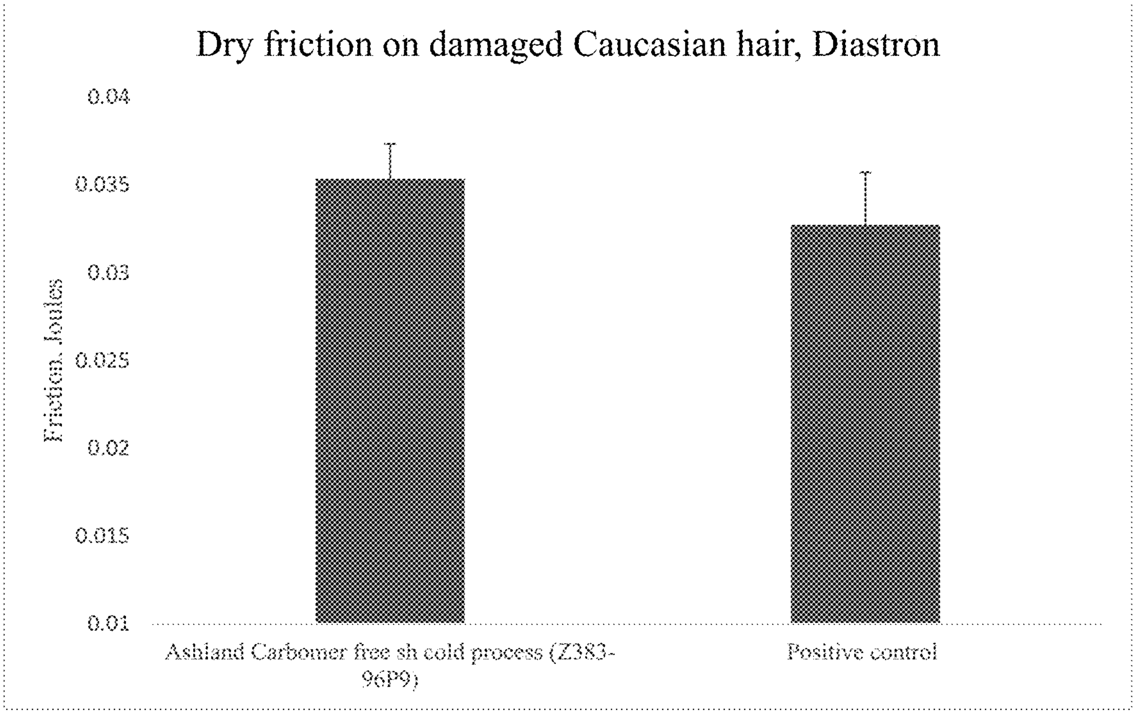
FIG. 4 shows the dry friction on damaged Caucasian hair.

Acrylate alkali soluble emulsion chemistries such as Carbomer are widely used in shampoos to suspend conditioning agents such as silicones. One of the reasons for their popularity is related to not having a negative influence on the silicone deposition on hair. HASE chemistries such as Acrylates copolymer are also used in shampoos on rinse-off systems due to their superior thickening and suspension properties. They are well known though to prevent the silicone deposition out of the conditioning shampoo to hair. In this example, demonstrated that the silicone deposition of current suspending polymer composition is comparable to the carbomer based systems and superior compared to the acrylates chemistries. It can be also seen that both acrylates copolymer and pure xanthan gum had a negative influence on the silicone deposition (FIG. 3 and FIG. 4).

Example 5: Preferred Foam Vs Xanthan Gum

Figure 5:
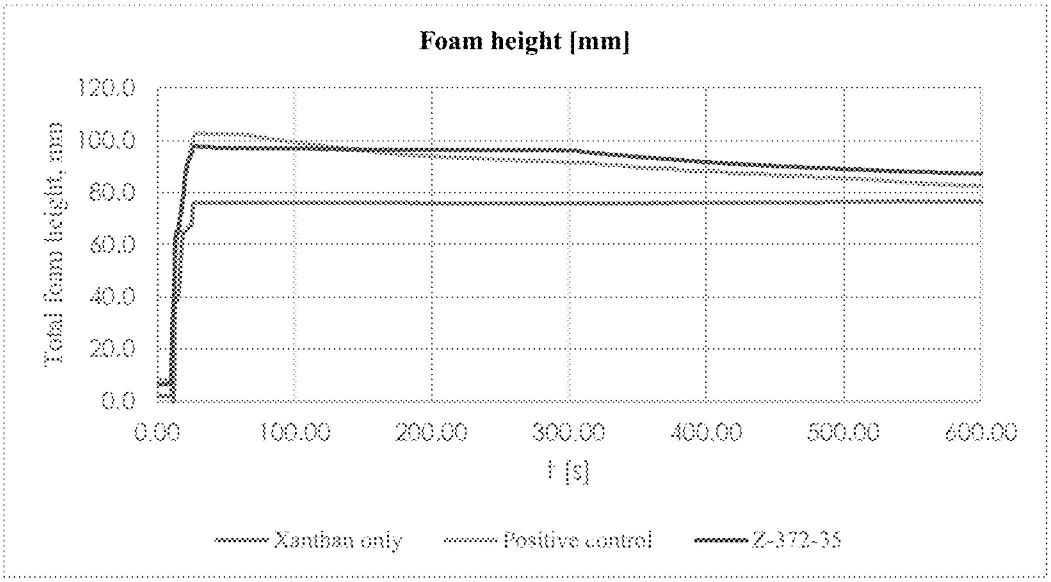
FIG. 5 shows foam height over time comparing 3 different rheology modifiers in the same surfactant system.

One of the important parameters in the rinse-off systems is the foam. Preferable rheology modifiers don't have an influence on foam. In this invention the foam properties such as flash foam, foam volume and foam stability of the shampoo containing the natural blend was tested against the same shampoo base with xanthan gum. It is clearly observed from the results that xanthan gum has an influence on the foam type and the stability. That can be related to more difficult to rinse-off shampoos. The natural blend didn't influence on the foam properties (FIG. 5).

Figure 6:
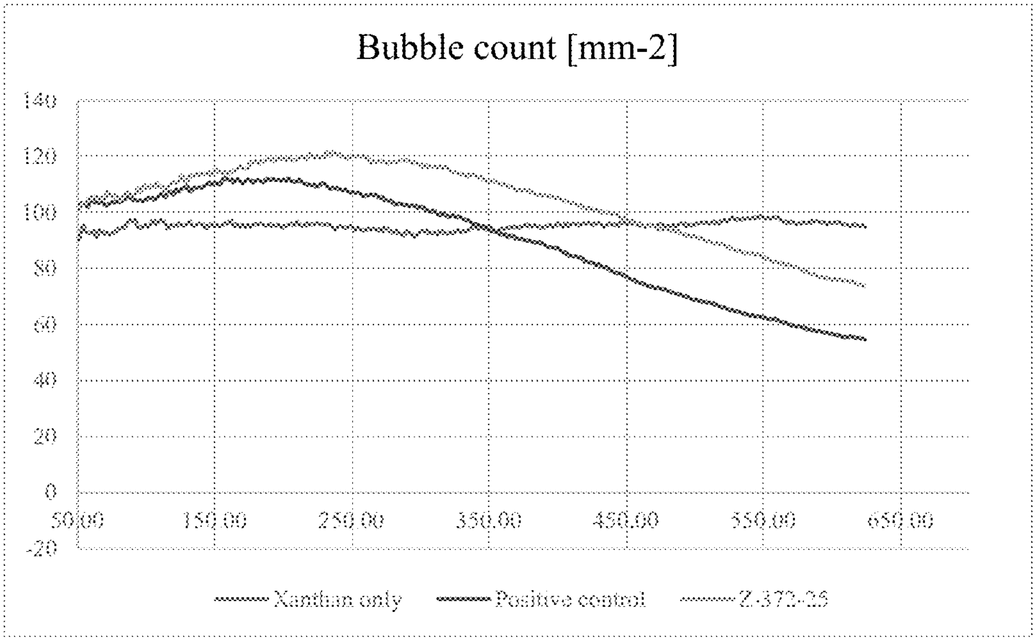
FIG. 6 represents bubble count of surfactant-based systems comparing 3 rheology modifiers.

It is observed from FIG. 6 that xanthan gum has a negative influence on the initial foam reducing the number of bubbles. On the other hand, it makes over time the foam very stable. Too stable foam was indicating a difficult to rinse performance.

Example 6: Rinse Off Conditioners Using Different Levels of Stabilizer Mix

| Ingredients | % w/w Sample 1 | Sample 2 | Sample 3 |
|---|---|---|---|
| Phase A | | | |
| Aqua | a.d.100% | a.d.100% | a.d.100% |
| Natural Blend (hydroxy propyl methyl cellulose, cetyl hydroxyethylcellulose, xanthan gum) | 0.1 | 0.3 | 0.6 |
| Phase B | | | |
| Behentrimonium chloride | 1.45 | 1.45 | 1.45 |
| Cetearyl alcohol | 3.0 | 3.0 | 3.0 |
| Phase C | | | |
| Disodium EDTA | 0.1 | 0.1 | 0.1 |
| Dimethicone, Trideceth-5 | 3.33 | 3.33 | 3.33 |
| Amodimethicone/Morpholinomethyl Silsesquioxane Copolymer (and) Trideceth-5 (and) Glycerin | 2.5 | 2.5 | 2.5 |
| Phenoxyethanol and Caprylyl glycol | 0.5 | 0.5 | 0.5 |
| Parfum | 0.3 | 0.3 | 0.3 |
| Phase D | | | |
| Citric acid | a.n. | a.n. | a.n. |
| Total | 100 | 100 | 100 |

*a.n-denotes needed

Example 7: Three Months Stability Results of Rinse-Off Conditioner

Figure 7:
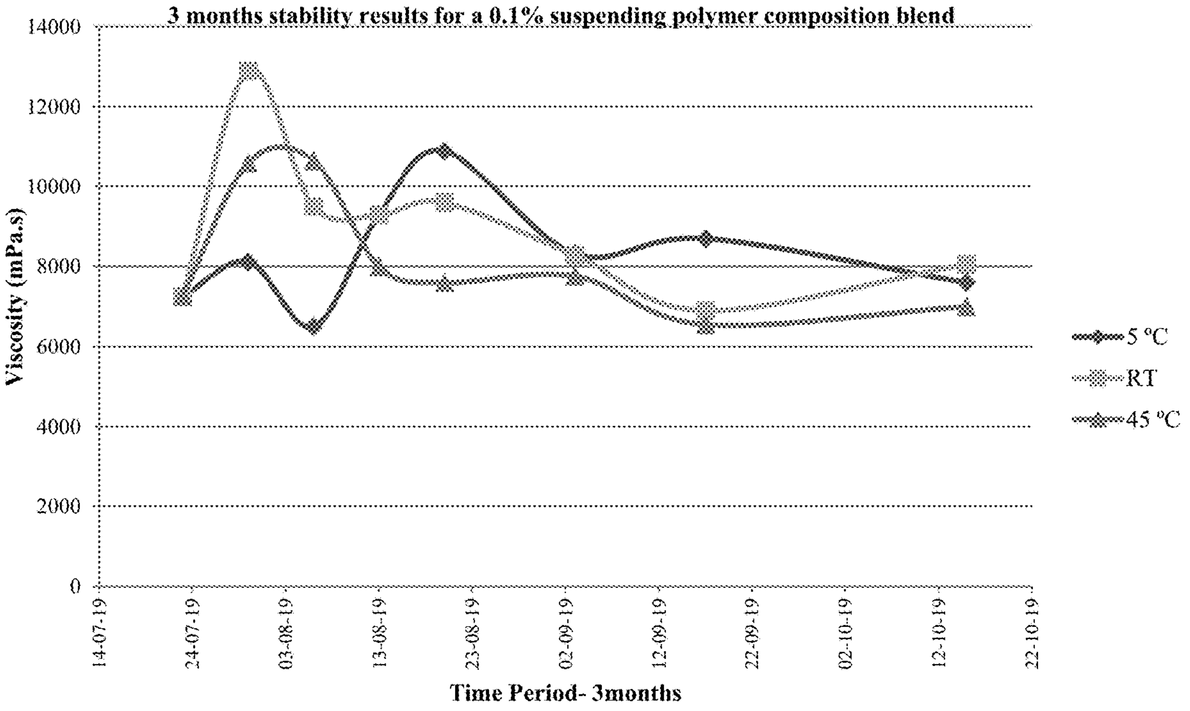
FIG. 7 depicts 3 months stability results for a 0.1% natural suspending polymer composition blend containing hydroxypropylmethylcellulose, cetyl-hydroxyethylcellulose, and xanthan gum.
Figure 8:
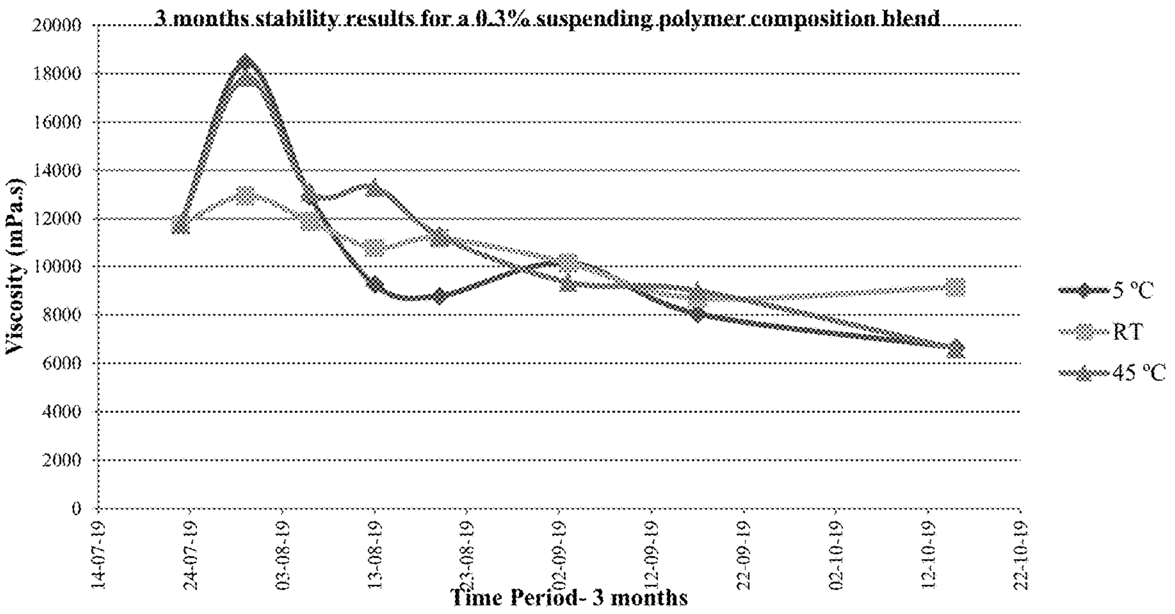
FIG. 8 depicts 3 months stability results for a 0.3% natural suspending polymer composition blend containing hydroxypropylmethylcellulose, cetyl-hydroxyethylcellulose, and xanthan gum.
Figure 9:
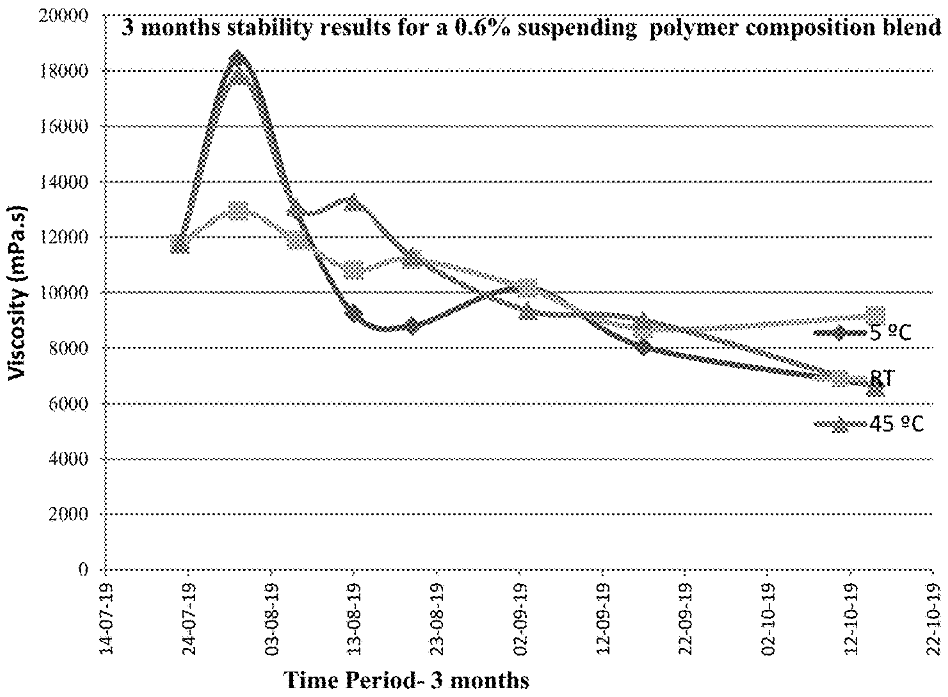
FIG. 9 depicts 3 months stability results for a 0.6% natural suspending polymer composition blend containing hydroxypropylmethylcellulose, cetyl-hydroxyethylcellulose, xanthan gum.

The Example 6 formulations are tested for 3-month stability tests for rinse off conditioner. Three months stability results of a low gel phase conditioner with the natural blend containing of hydroxypropylmethylcellulose (HPMC), cetyl-hydroxyethylcellulose (cetyl-HEC), xanthan gum. FIG. 7, FIG. 8 and FIG. 9 show that the respective formulation containing 0.1%, 0.3% and 0.6% natural blend of hydroxypropylmethylcellulose, cetyl hydroxyethylcellulose, xanthan gum at 5° C., room temperature (RT at 21° C.) and 45° C.

Example 8: Three Months Stability Results Containing 0.3 and 0.6% Formulations

It is observed that, formulation containing 0.1% (FIG. 7) is stable at three different temperatures for three months wherein, the formulations containing 0.3 and 0.6% (FIG. 8 and FIG. 9) respectively shows similar character in terms of stability. At room temperature, both formulations are stable. Slight decrease in viscosity is observed at lower and higher temperatures after three months. Data show that with addition of 0.1% thickener formulation the rinse-off conditioner was stabilized.

Figure 12:
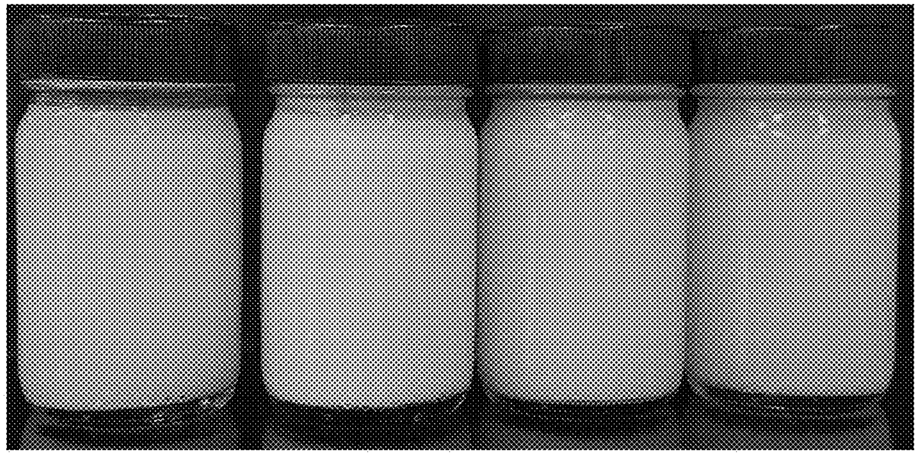
FIG. 12 shows formula with silicone, antidandruff formula, silicone-free formula with natural oils and sulfate free formula.

Example 9: Different Shampoo Formulation Systems to Suspend Mica and Silicone (FIG. 1 and FIG. 12)

Figure 10:
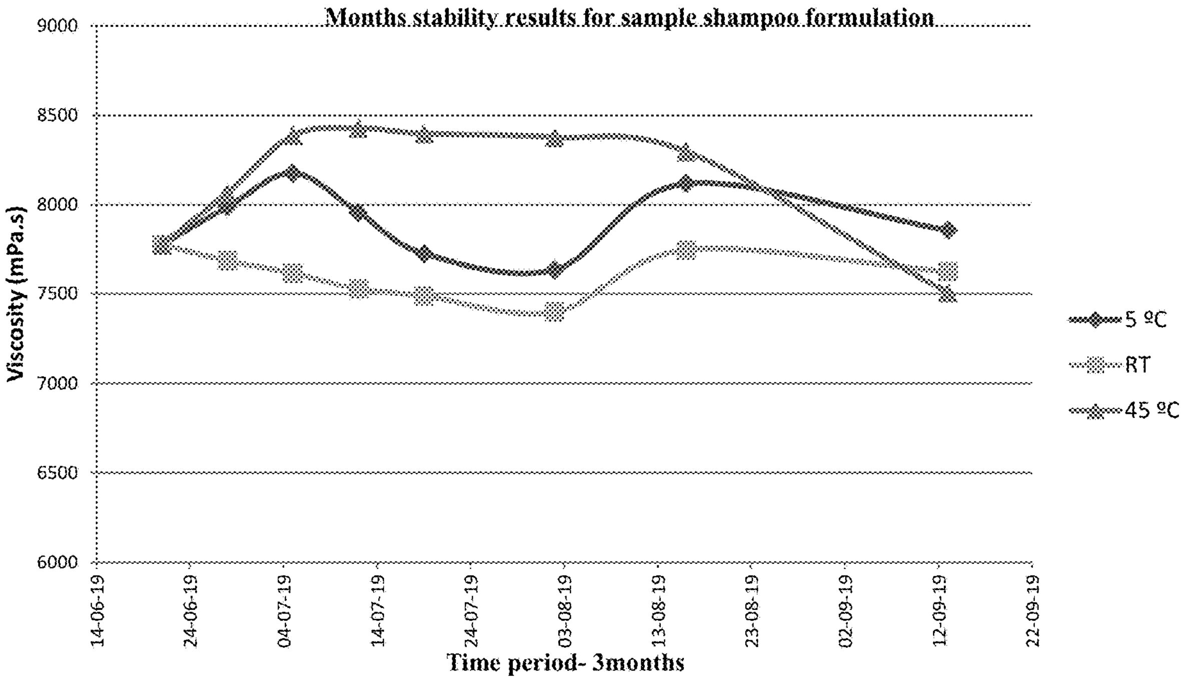
FIG. 10 depicts 3 months stability results for natural suspending polymer composition blend containing hydroxypropylmethylcellulose, cetyl-hydroxyethylcellulose, xanthan gum in a shampoo formulation.
Figure 11:
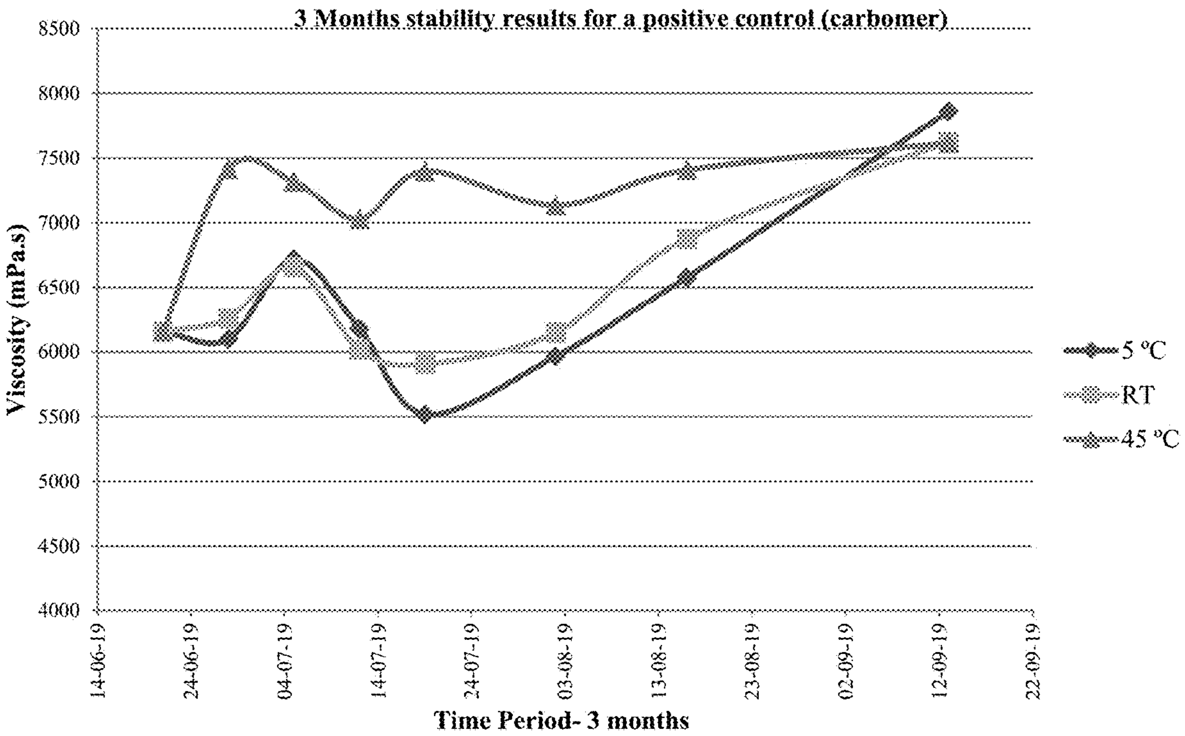
FIG. 11 depicts 3 months stability results for a positive control containing carbomer.
Figure 16:
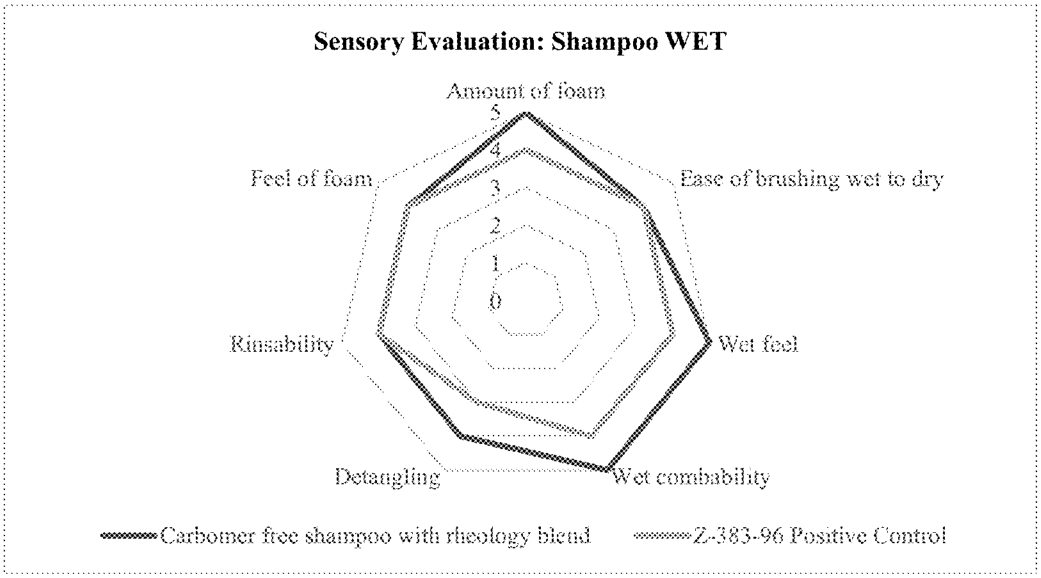
FIGS. 16 and 17 depicts sensory evaluation shampoo wet and shampoo dry.
Figure 17:
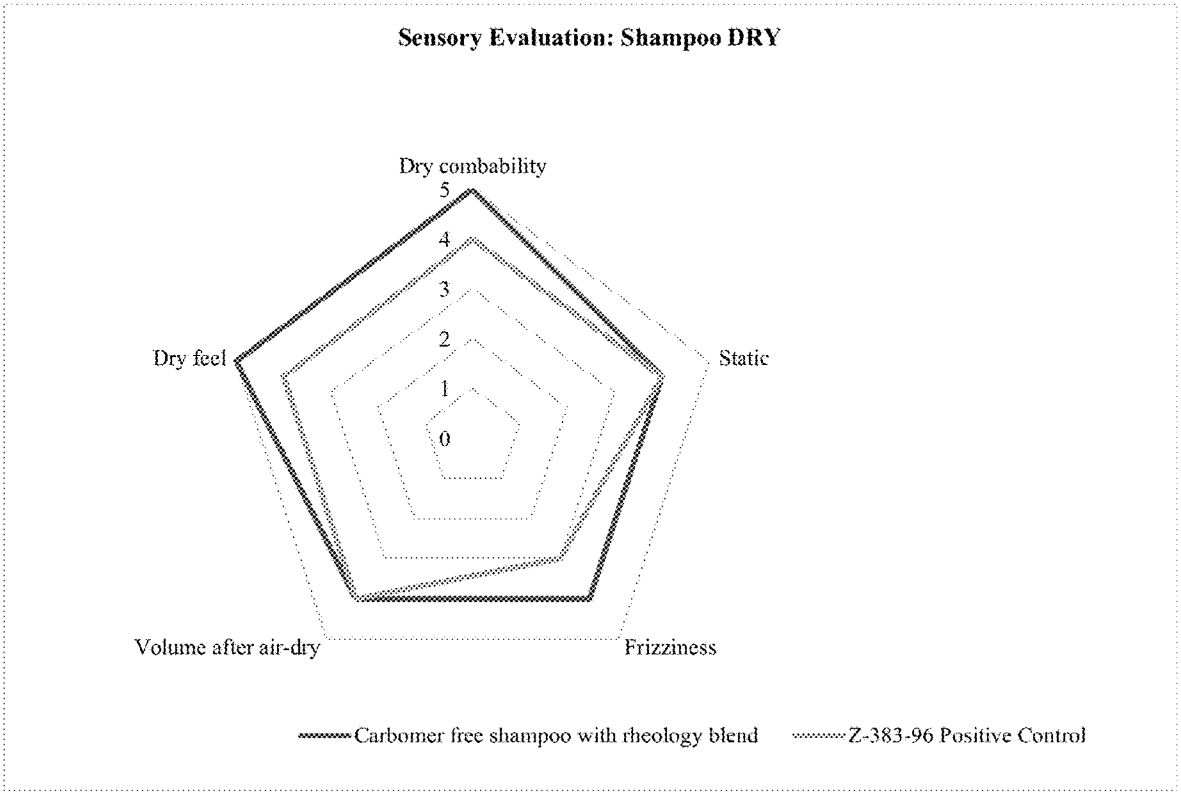

Sample 9 shampoo formulation was stable at low temperature and high temperature for three months as shown in FIG. 10 and FIG. 11. The shampoo formulation has no negative impact on the sensory, however natural blend is having a positive impact on wet/dry hair combability and hair feel when used in a shampoo application shown in FIG. 16 and FIG. 17.

| Ingredients | % w/w Sample 7 | Sample 8 | Sample 9 |
|---|---|---|---|
| Phase A | | | |
| Aqua | a.d.100% | a.d.100% | a.d.100% |
| Mica and Titanium oxide | 0.1 | 0.1 | 0.1 |
| Guar hydroxypropyltrimonium chloride | 0.2 | 0.2 | 0.2 |
| Citric acid | 0.05 | 0.05 | 0.05 |
| Cocamidopropyl Betaine | 6.67 | 6.67 | 6.67 |
| Sodium laureth(2EO) sulfate | 42.86 | 42.86 | 42.86 |
| Sodium hydroxide | >8.5 pH | >8.5 pH | >8.5 pH |
| Phase B | | | |
| Glycerin | 3.0 | 3.0 | 3.0 |
| Xanthan Gum | — | — | 0.1 |
| Hydroxypropyl methylcellulose | 0.4 | 0.5 | 0.5 |
| Cetylhydroxyethyl cellulose | 0.1 | 0.2 | 0.15 |
| Phase C | | | |
| Dimethiconol (and) TEA-Dodecylbenzenesulfonate | 3.0 | 3.0 | 3.0 |
| Phenoxyethanol and Caprylyl Glycol | 1.0 | 1.0 | 1.0 |
| Parfum | 0.5 | 0.5 | 0.5 |
| Phase D | | | |
| Citric acid/Sodium hydroxide | a.n | a.n | a.n |
| Sodium chloride | a.n. (1%) | a.n. (1%) | a.n. (1%) |
| Total | 100 | 100 | 100 |

*a.n denotes as needed

Example 10: Suspension of Zinc Pyrithione in Anti-Dandruff Shampoos

Figure 13:
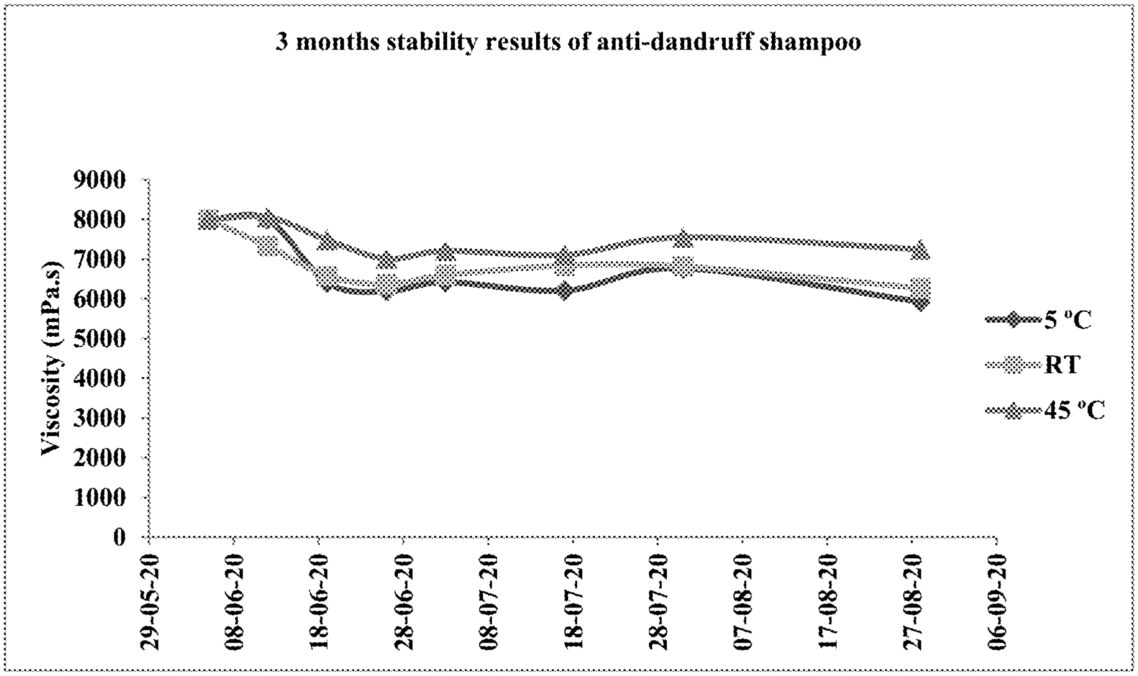
FIG. 13 depicts 3 months stability results of anti-dandruff shampoo.

Fully formulated anti-dandruff shampoo which was used for the studies. Zinc Pyrithione was widely used by the personal care industry as an active ingredient in anti-dandruff shampoos. It was suspended in the shampoo by using a suspension agent such as Poly(acrylic acid). Phase A: Disperse the natural blend slowly with good mixing. Sodium hydroxide was added and mix for 30 min. until fully hydrated and the surfactants were added in the right order. Phase B was dispersed until lump free and add to phase A; Phase C ingredients were added in order with good stirring and adjust Phase D with pH with citric acid or NaOH and sodium chloride to the desired viscosity. The creamy viscous liquid was maintained at 5.5-6.5 pH and at 6,000-8,000 mPa·s Brookfield LVT Spindle #3, 12 RPM, 1 min @ 25° C. The formulation containing 0.1% (FIG. 13) is stable at three different temperatures for three months wherein, the formulations containing 0.3 and 0.6% respectively shows similar character in terms of stability. Data show that with addition of 0.1% thickener formulation the antidandruff shampoo was stabilized.

| Ingredients | % w/w |
|---|---|
| Phase A | |
| Deionised water | ad 100% |
| Hydroxypropyl Methylcellulose (and) Cetyl Hydroxyethylcellulose (and) Xanthan Gum | 0.60 |
| Sodium hydroxide | 0.03 |
| Cocamidopropyl Betaine | 6.67 |
| Sodium Laureth Sulfate | 42.86 |
| Phase B | |
| Aqua | 5.00 |
| Guar Hydroxypropyltrimonium Chloride | 0.20 |

-continued

| Ingredients | % w/w |
|---|---|
| Phase C | |
| Phenoxyethanol and Caprylyl Glycol | 1.00 |
| Parfum | 0.50 |
| Dimethiconol (and) TEA-Dodecylbenzenesulfonate | 3.00 |
| Zinc Pyrithione | 2.00 |
| Phase D | |
| Citric Acid | a.n. |
| Sodium Chloride | a.n.(1%) |
| Total | 100 |

*a.n denotes as needed

Figure 14:
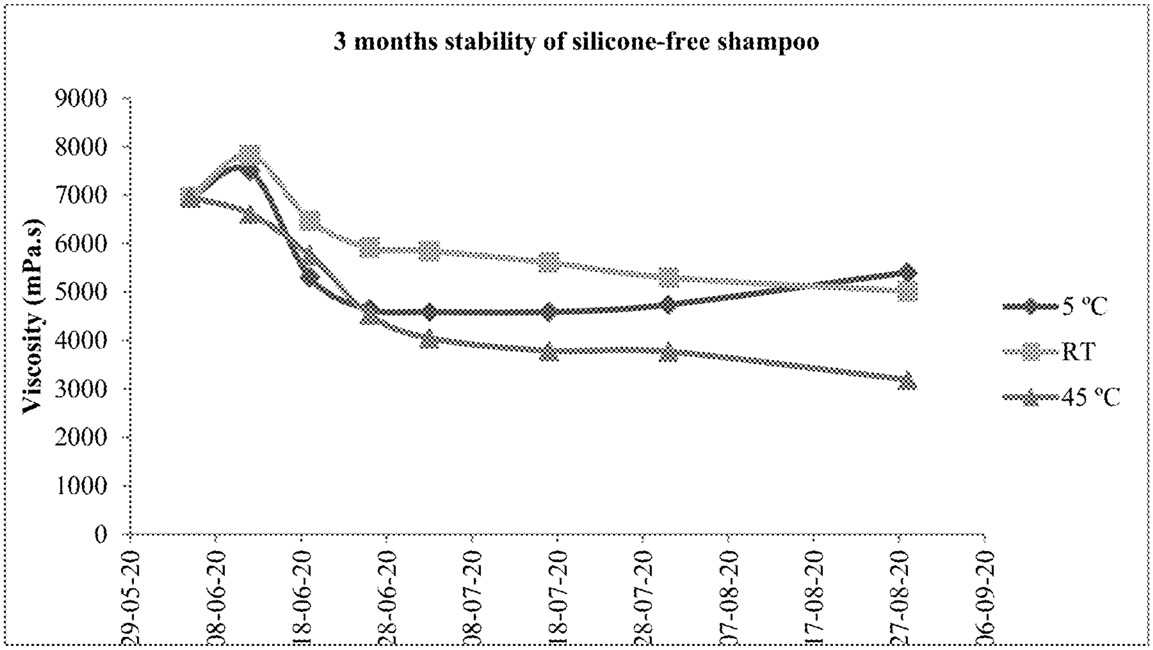
FIG. 14 depicts 3 months stability of silicone-free shampoo.

Example 11: Suspension of Natural Oils (Coconut Oil and Meadow Oil) in Shampoo Applications Fully formulated silicone free shampoo which was used for the studies. Coconut oil and meadowfoam oil was suspended in the shampoo by using a suspension agent such as Poly(acrylic acid). Phase A: Disperse the natural blend slowly with good mixing. Sodium hydroxide was added and mix for 30 min. until fully hydrated and the surfactants were added in the right order. Phase B was dispersed until lump free and add to phase A; Phase C ingredients were added in order with good stirring and adjust Phase D with pH with citric acid or NaOH and sodium chloride to the desired viscosity. The creamy viscous liquid was maintained at 5.5-6.5 pH and at 6,000-8,000 mPa·s Brookfield LVT Spindle #3, 12 RPM, 1 min @ 25° C. The formulation containing 0.1% (FIG. 14) is stable at three different temperatures for three months wherein, the formulations containing 0.3 and 0.6% respectively shows similar character in terms of stability. Data show that with addition of 0.1% thickener formulation the silicon free shampoo suspension of natural oils coconut and meadow oil was stabilized.

| Ingredients | % w/w |
|---|---|
| Phase A | |
| Aqua | ad 100% |
| Mica, Titaniumdioxide | 0.1 |
| Hydroxypropyl Methylcellulose (and) Cetyl Hydroxyethylcellulose (and) Xanthan Gum | 0.70 |
| Sodium hydroxide | 0.03 |
| Cocamidopropyl Betaine | 10.00 |
| Sodium Laureth Sulfate | 39.30 |
| Phase B | |
| Deionized Water | 5.00 |
| Guar Hydroxypropyltrimonium Chloride | 0.20 |
| Phase C | |
| Phenoxyethanol and Caprylyl Glycol | 1.00 |
| Parfum | 0.50 |
| *Cocos Nucifera* (Coconut) Oil | 0.50 |
| *Limnanthes Alba* (Meadowfoam) Seed Oil | 1.00 |
| Phase D | |
| Citric Acid | a.n. |
| Sodium Chloride | a.n.(1%) |
| Total | 100 |

Figure 15:
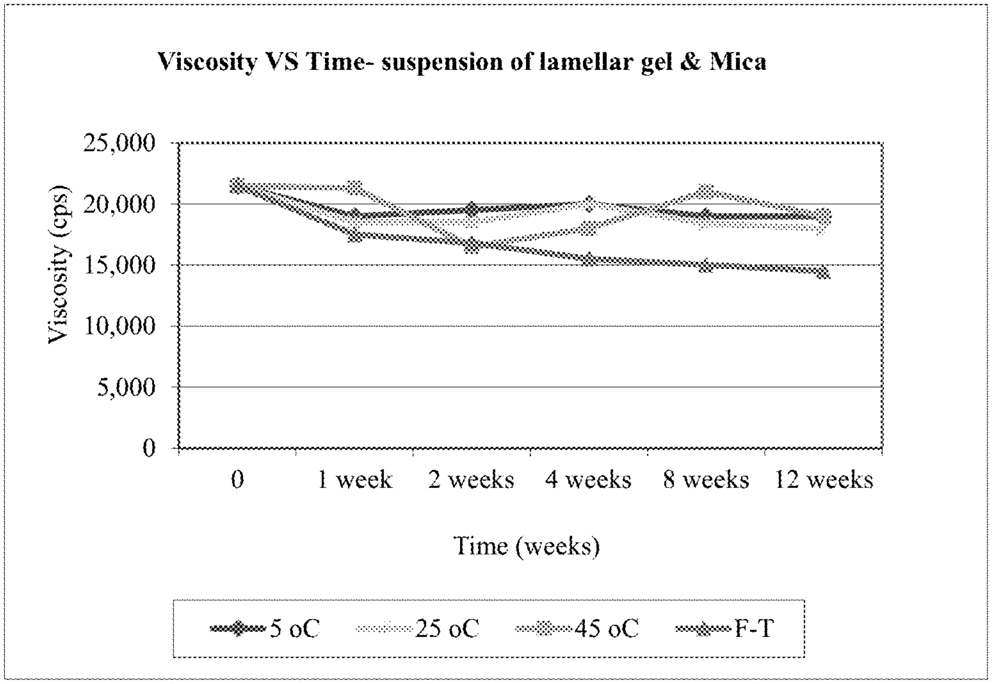
FIG. 15 depicts 3 months stability results of suspension of lamellar gel and mica.

Example 12: Creamy Body Wash Formula with Suspension of Lamellar Gel & Mica 0.8% Natural blend polymer in a body wash formulation was used to suspend mica and Prolipid 161 lamellar gel. Phase A: Disperse the natural blend slowly with good mixing. Heat to 65 C and mix for 30 min. until fully hydrated, and the surfactants were added. Phase B was solubilized at 80° C. until lump free and add to phase A; Phase C ingredients were added in order with good stirring and add the ingredients of Phase D are added in right order. The formula is stable 3 months at different temperatures (FIG. 15).

| Ingredients | % w/w |
|---|---|
| Phase A | |
| Deionized water | 63.86 |
| Glycerin | 2.00 |
| Hydroxypropyl methylcellulose (and) Cetyl hydroethylcellulose (and) Xanthan gum | 0.80 |
| Sodium Laureth Sulfate (and) Water | 17.14 |
| Phase B | |
| Diisopropyl Adipate | 2.00 |
| Hydroxyethyl cetearamidopropyl dimonium chloride (and) Behenyl alcohol (and) Cetearyl alcohol | 1.00 |
| Phase C | |
| Cocamidopropyl Betaine (and) Water | 10.00 |
| Dimethyl Lauramide/Myristamide | 1.00 |
| Phase D | |
| Butylated Hydroxytoluene | 0.10 |
| Phenoxyethanol (and) Caprylyl Glycol | 1.00 |
| Sodium Hydroxymethylglycinate (and) Water | 0.50 |
| Mica (and) Titanium Dioxide | 0.10 |
| Octyldodecanol (and) Pogostemon cablin leaf extract | 0.50 |
| Total | 100.00% |

Example 13: Suspension of Microencapsulates in Fabric Conditioners

Fully formulated fabric conditioner which was used for the studies. Parfum containing microencapsulates were used in this formulation to get a burst of fresh smelling clothing long after the clothing is washed. These microencapsulates were suspended in the formulation by using the natural blend as suspension agent. Phase A: Disperse the natural blend slowly with good mixing. Sodium hydroxide was added and mix for 30 min. until fully hydrated and the esterquat was added and mix for 30 min. until a homogeneous emulsion; Phase B was dispersed until homogeneous and added to phase A; Phase C was added with careful stirring to ensure that the encapsulates do not break in the formulation and stirred for 10 min. to evenly distribute trough the formulation. The light viscous liquid was maintained at 3.0-3.5 pH and at 150-250 mPa·s Brookfield LVT Spindle #2, 30 RPM, 1 min @ 25° C.

| Ingredients | % w/w |
|---|---|
| Phase A | |
| Deionized water | ad 100% |
| Hydroxypropyl Methylcellulose (and) Cetyl Hydroxyethylcellulose (and) Xanthan Gum | 0.10 |

-continued

| Ingredients | % w/w |
|---|---|
| Sodium hydroxide | 0.03 |
| Quartenary TEA esters, C16-18 and C18 unsaturated, methosulfate | 5.55 |
| Phase B | |
| C6-12 Alcohols Ethoxylated Propoxylated Seed Oil Alcohol Ethoxylate 9EO | 0.50 |
| Fragrance | 0.50 |
| Phase C | |
| Microencapsulated with fragrance encapsulated | 1.77 |
| Total | 100 |

*a.n denotes as needed

Example 14: Three Months Stability Results of Fabric Conditioner

The Example 13 formulation was tested for 3-month stability tests for fabric conditioner. It was observed that the formulation containing 0.1% was stable at three different temperatures for three months.

While the compositions and methods of the disclosed and/or claimed inventive concept(s) have been described in terms of particular aspects, it will be apparent to those of ordinary skill in the art that variations may be applied to the compositions and/or methods and in the steps or in the sequence of steps of the method described herein without departing from the concept, spirit and scope of the disclosed and/or claimed inventive concept(s). All such similar substitutes and modifications apparent to those skilled in the art are deemed to be within the spirit, scope and concept of the disclosed and/or claimed inventive concept(s).

What is claimed is:

1. A suspending polymer composition comprising a blend of:

(i) about 40 to about 80 wt. % of hydroxypropylmethylcellulose (HPMC);

(ii) about 10 to about 30 wt. % of xanthan gum; and (iii) about 10 to about 30 wt. % of cetyl-hydroxy ethyl cellulose (cetyl-HEC).

2. The composition according to claim 1, wherein the hydroxypropylmethylcellulose (HPMC) is in the range of from about 50 to about 70 wt. %.

3. The composition according to claim 1, wherein the xanthan gum is in the range of from about 15 to about 25 wt. %.

4. The composition according to claim 1, wherein the cetyl-hydroxy ethyl cellulose is in the range of from about 15 to about 25 wt. %.

5. An aqueous based personal care or home care composition comprising the suspending polymer composition of claim 1.

6. The composition according to claim 5, wherein the personal care composition is a hair care or skin care composition.

7. The composition according to claim 1, wherein the cetyl-hydroxy ethyl cellulose has a weight average molecular weight of from about 50,000 to about 1,000,000 Daltons.

8. The composition according to claim 1, wherein the cetyl-hydroxy ethyl cellulose has a weight average molecular weight of from about 200,000 to about 700,000 Daltons.

9. The composition according to claim 5, wherein the aqueous personal care or home care composition comprises:

a. about 0.05 to about 5 wt. % of the suspending polymer composition blend of claim 1 comprising: (i) about 40 to about 80 wt. % of hydroxypropylmethylcellulose; (ii) about 10 to about 30 wt. % of xanthan gum; (iii) about 10 to about 30 wt. % of cetyl-hydroxy ethyl cellulose;

b. about 0.1 to abut 30 wt. % of at least one surfactant selected from the group consisting of anionic, cationic, nonionic, zwitterionic, amphoteric and combinations thereof;

c. about 0.1 to about 10 wt. % of at least one home care ingredient or personal care ingredient; and d. about 30 to about 70 wt. % water based on the total weight of the composition.

10. The composition according to claim 9, wherein the personal care ingredient is selected from the group consisting of water-insoluble ingredients, oxidizing agents, conditioning agents, humectants, pH adjusting buffers, waxes, mineral oils, emulsifiers, fatty substances, gelling agents, thickeners, emollients, hydrophilic or lipophilic active agents, antioxidants, sequestering agents, preserving agents, acidifying or basifying agents, fragrances, fillers, dyestuffs, plant extracts, moisturizers, proteins, peptides, neutralizing agents, solvents, anti-dandruff ingredients, reducing agents and combinations thereof.

11. The composition according to claim 9, wherein the home care ingredient is selected from the group consisting of water-insoluble ingredients, solvents, phosphates, phosphonates, chelating agents, defoamers, fabric conditioners, polish additives, plasticizers, colorants, preservatives, fragrances, antifoam compounds, antibacterial or antifungal agents, abrasives, enzymes, optical brighteners, antioxidants, emulsifiers, functional polymers, viscosifying agents, alcohols, oils, dyes transfer inhibitors, hydrotropes, dye sequestrants, colour fixatives, anti-redeposition agents, pH controlling agents, electrolytes, bleaching agents, softeners, fibres and care agents and combinations thereof.

12. The composition according to claim 9, wherein the home care ingredient or personal care ingredient comprises water-insoluble ingredients selected from the group consisting of silicones, natural and synthetic oils, emollients, inorganic and organic pearlescent pigments, beads, fatty alcohols, discrete particles and polymers thereof.

13. The composition according to claim 12, wherein the silicone is selected from the group consisting of polydimethylsiloxane, amodimethicone, amodimethicone macroemulsion, amodimethicone microemulsion, dimethicone, dimethiconol (silicone gum), cyclomethicone, phenyltrimethicone, dimethicone, dimethiconol microemulsion, dimethiconol macroemulsion, organo polysiloxane, alkoxysilicone, and combinations thereof.

14. The composition according to claim 12, wherein the pearlescent pigments are selected from the group consisting of titanium dioxide, zirconium oxide, cerium oxide, zinc oxide, iron oxide, chromium oxide, manganese violet, ultramarine blue, ferric blue, carbon black, lakes based on cochineal carmine or on barium, strontium, calcium or aluminium, mica coated with titanium or with bismuth oxychloride, titanium mica with iron oxides, titanium mica with ferric blue or with chromium oxide and combinations thereof.

15. The composition according to claim 5, wherein the personal care composition is a rinse-off or leave-in composition.

16. The composition according to claim 5, wherein the aqueous personal care composition is formulated into a spray, a lotion, a mousse, a fluid, a serum, a solution, a perm, an emulsion, a gel, a vesicle a dispersion, a paste, a cream, a solid stick, a shampoo, a balm, a wipe, a milk, a foam, a jelly, or a liquid.

17. The composition according to claim 5, wherein the personal care composition is selected from the group consisting of hair-care products, shampoos, hair conditioners, leave in and rinse off conditioners, styling and treating hair compositions, hair perming products, hair relaxants, hair straighteners, hair sprays and lacquers, permanent hair dyeing systems, hair styling mousses, hair gels, semi-permanent hair dyeing systems, temporary hair dyeing systems, hair bleaching systems, permanent hair wave systems, hair setting formulations, skin-care products, bath products, shower products, liquid soaps, bar soaps, fragrances and/or odoriferous ingredients consisting preparations, deodorizing and antiperspirant preparations, decorative preparations, light protection formulations, shaving lotions, body oils, body lotions, body gels, treatment creams, body cleaning products, skin protection ointments, shaving and aftershave preparations, skin powders, lipsticks, nail varnishes, eye shadows, mascaras, dry and moist make-up, rouge, powders, depilatory agents and sun care products.

18. The composition according to claim 5, wherein the home care composition is selected from the group consisting of laundry washing products, dish washing products, heavy duty cleaning products, machinery lubricating products, disinfecting products, fabric enhancing products, fabric softener, fabric abrasion reducing products, toilet cleaning products, floor cleaning products, window cleaning products, auto polishing products, auto cleaning products, shoe polishing products, shoe restoration products, paint remover products, household fragrance products, wall coloring products and wall paper adhesives products.

19. The composition according to claim 5, wherein the aqueous personal care or home care composition is free of acrylates and methacrylates.

20. An aqueous, acrylate and methacrylate free, surfactant-based personal care or home care composition comprising:

a. about 0.05 to about 5 wt. % of a suspending polymer composition comprising a blend of (i) about 50 to about 60 wt. % of hydroxypropylmethylcellulose (HPMC); (ii) about 10 to about 20 wt. % of xanthan gum; (iii) about 10 to about 20 wt. % of cetyl-hydroxy ethyl cellulose;

b. about 0.1 to about 30 wt. % of at least one surfactant selected from the group consisting of anionic, cationic, nonionic, zwitterionic, amphoteric and combinations thereof;

c. 0.1 to 10 wt. % of at least one home care ingredient or personal care ingredient; and d. about 30 to about 70 wt. % water based on the total weight of the composition.

21. An aqueous, acrylate and methacrylate free, surfactant-based shampoo composition comprising:

a. about 0.05 to about 5 wt. % of a suspending polymer composition comprising a blend of (i) about 50 to about 60 wt. % of hydroxypropylmethylcellulose (HPMC); (ii) about 10 to about 20 wt. % of xanthan gum; (iii) about 10 to about 20 wt. % of cetyl-hydroxy ethyl cellulose;

b. about 0.1 to about 30 wt. % of at least one surfactant selected from the group consisting of anionic, cationic, nonionic, zwitterionic, amphoteric and combinations thereof;

c. 0.1 to 10 wt. % of at least one personal care ingredient; and d. about 30 to about 70 wt. % water based on the total weight of the composition.

22. The shampoo composition according to claim 21, wherein the composition is a rinse-off composition.

23. The shampoo composition according to claim 21, wherein the composition comprises at least one water-insoluble ingredient selected from the group consisting of silicones, natural and synthetic oils, emollients, inorganic and organic pearlescent pigments, beads, fatty alcohols, discrete particles and polymers.

24. The shampoo composition according to claim 21, wherein the personal care ingredient is selected from the group consisting of water-insoluble ingredients, oxidizing agents, conditioning agents, humectants, pH adjusting buffers, waxes, mineral oils, emulsifiers, fragrances, preservatives, fatty substances, gelling agents, thickeners, emollients, hydrophilic or lipophilic active agent, antioxidants, sequestering agents, preserving agents, acidifying or basifying agents, fragrances, fillers, dyestuffs, plant extracts, moisturizers, proteins, peptides, neutralizing agents, solvents, anti-dandruff ingredients, reducing agents and combinations thereof.

* * * * *